(12) United States Patent
Iwamoto

(10) Patent No.: US 12,292,556 B2
(45) Date of Patent: May 6, 2025

(54) ZOOM LENS AND IMAGE PICKUP APPARATUS

(71) Applicant: CANON KABUSHIKI KAISHA, Tokyo (JP)

(72) Inventor: Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/498,090

(22) Filed: Oct. 31, 2023

(65) Prior Publication Data

US 2024/0061224 A1 Feb. 22, 2024

Related U.S. Application Data

(63) Continuation of application No. 17/331,696, filed on May 27, 2021, now Pat. No. 11,841,489.

(30) Foreign Application Priority Data

Jun. 8, 2020 (JP) ................. 2020-099674

(51) Int. Cl.
*G02B 15/16* (2006.01)
*G02B 15/14* (2006.01)

(52) U.S. Cl.
CPC ......... *G02B 15/1461* (2019.08); *G02B 15/16* (2013.01)

(58) Field of Classification Search
CPC .... G02B 15/1461; G02B 15/16; G02B 15/14; G02B 13/18; G02B 15/20; G02B 9/14; G02B 9/30; G02B 9/34; G02B 9/60; G02B 9/62

See application file for complete search history.

(56) References Cited

U.S. PATENT DOCUMENTS

| 8,873,155 | B2 | 10/2014 | Kimura |
| 9,128,273 | B2 | 9/2015 | Fujisaki |
| 9,134,512 | B2 | 9/2015 | Iwamoto |
| 9,217,851 | B2 | 12/2015 | Iwamoto |
| 9,453,990 | B2 | 9/2016 | Nanba |
| 9,851,582 | B2 | 12/2017 | Miyazawa |
| 10,078,202 | B2 | 9/2018 | Iwamoto |

(Continued)

FOREIGN PATENT DOCUMENTS

| JP | H11-064728 A | 3/1999 |
| JP | H11-64729 A | 3/1999 |

(Continued)

OTHER PUBLICATIONS

Notice of Reasons for Refusal issued by the Japanese Patent Office on Jan. 30, 2024 in corresponding JP Patent Application No. 2020-099674, with English translation.

(Continued)

*Primary Examiner* — Balram T Parbadia
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, a third lens unit having a positive refractive power, and a rear unit having a plurality of lens units, and distances change between adjacent lens units during zooming. A predetermined condition is satisfied.

13 Claims, 11 Drawing Sheets

(56) References Cited

U.S. PATENT DOCUMENTS

| | | |
|---|---|---|
| 10,416,421 B2 | 9/2019 | Iwamoto |
| 10,663,703 B2 | 5/2020 | Iwamoto |
| 10,754,169 B2 | 8/2020 | Iwamoto |
| 11,143,852 B2 | 10/2021 | Yamanaka |
| 2009/0231726 A1 | 9/2009 | Nanba |
| 2009/0323198 A1 | 12/2009 | Kusaka |
| 2010/0149654 A1 | 6/2010 | Ookubo |
| 2011/0273776 A1* | 11/2011 | Obama .......... G02B 15/143105 359/581 |
| 2012/0113527 A1 | 5/2012 | Horiuchi |
| 2013/0278814 A1 | 10/2013 | Yamasaki |
| 2014/0055659 A1 | 2/2014 | Iwamoto |
| 2015/0160442 A1 | 6/2015 | Nanba |
| 2016/0054579 A1 | 2/2016 | Miyazawa |
| 2019/0004277 A1 | 1/2019 | Iwamoto |
| 2019/0212525 A1 | 7/2019 | Abe |
| 2020/0174234 A1 | 6/2020 | Katayose |
| 2020/0341248 A1 | 10/2020 | Iwamoto |
| 2023/0010047 A1 | 1/2023 | Iwamoto |
| 2023/0266583 A1 | 8/2023 | Iwamoto |
| 2023/0384570 A1 | 11/2023 | Iwamoto |
| 2024/0053591 A1 | 2/2024 | Iwamoto |
| 2024/0159996 A1 | 5/2024 | Iwamoto |

FOREIGN PATENT DOCUMENTS

| | | |
|---|---|---|
| JP | 2016-148731 A | 8/2016 |
| JP | 2017-049445 A | 3/2017 |
| JP | 2017-134302 A | 8/2017 |
| JP | 2018-146739 A | 9/2018 |
| JP | 2019-020679 A | 2/2019 |
| JP | 2020-020948 A | 2/2020 |
| JP | 2020-064176 A | 4/2020 |
| JP | 2021-193435 A | 12/2021 |

OTHER PUBLICATIONS

Notice of Reasons for Refusal issued by the Japanese Patent Office on Feb. 4, 2025 in corresponding JP Patent Application No. 2024-071058, with English translation.

\* cited by examiner

ZOOM LENS AND IMAGE PICKUP APPARATUS

CROSS REFERENCE TO RELATED APPLICATIONS

This application is a continuation of U.S. patent application Ser. No. 17/331,696, filed on May 27, 2021, which claims the benefit of and priority to Japanese Patent Application No. 2020-099674, filed Jun. 8, 2020, each of which is hereby incorporated by reference herein in their entirety.

BACKGROUND OF THE INVENTION

Field of the Invention

The present invention relates to a zoom lens suitable for a digital camera, a video camera, a surveillance camera, and the like, and an image pickup apparatus having the same.

Description of the Related Art

Japanese Patent Laid-Open Nos. ("JPs") 2017-049445, 2018-146739, and 2019-020679 each disclose a zoom lens that includes, in order from an object side to an image side, a first lens unit having a positive refractive power, a second lens unit having a negative refractive power, a third lens unit having a positive refractive power, and a plurality of lens units.

In the zoom lenses disclosed in JPs 2017-049445, 2018-146739, and 2019-020679, in order to realize a high magnification, it is effective to increase a large moving amount of a lens unit or the power of the lens unit in the zoom lens. However, a larger moving amount of the lens unit would complicate a mechanism and make larger the zoom lens. A larger power of the lens unit would intensify the aberrational fluctuations during zooming, and high performance becomes hard to realize.

SUMMARY OF THE INVENTION

The present invention provides a compact zoom lens having a high magnification and a high optical characteristic, and an image pickup apparatus having the same.

A zoom lens according to one aspect of the present invention includes, in order from an object side to an image side, a first lens unit having a positive refractive power, a second lens unit having a negative refractive power, a third lens unit having a positive refractive power, and a rear unit having a plurality of lens units. Distances changing between adjacent lens units during zooming. The following conditional expressions are satisfied:

$$0.20 < f1/ft < 0.40$$

$$-4.0 < mr/bfw < -1.5$$

$$-7.0 < m3/bfw < -2.5$$

where f1 is a focal length of the first lens unit, ft is a focal length of the zoom lens at a telephoto end, mr is a moving amount of a lens unit LR closest to an image plane in the rear unit during zooming from a wide-angle end to the telescopic end, bfw is a distance on an optical axis from a surface closest to the image plane of the lens unit LR to the image plane at the wide-angle end, m3 is a moving amount of the third lens unit during zooming from the wide-angle end to the telephoto end, and a sign of a moving amount of each lens unit is positive when the lens unit moves from the object side to the image side and negative when the lens unit moves from the image side to the object side.

An image pickup apparatus according to another aspect of the present invention includes the above zoom lens, and an image sensor configured to receive an image formed by the zoom lens.

Further features of the present invention will become apparent from the following description of exemplary embodiments with reference to the attached drawings.

DESCRIPTION OF THE EMBODIMENTS

Figure 1:
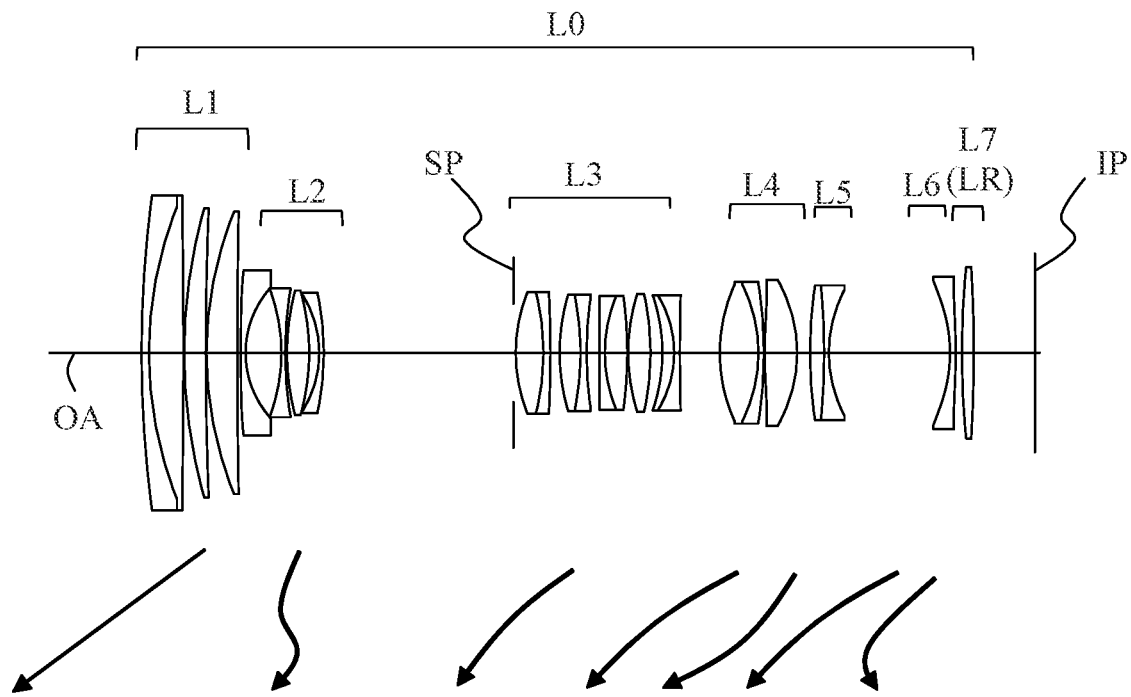
FIG. 1 is a sectional view of a zoom lens according to Example 1.
Figure 2A:
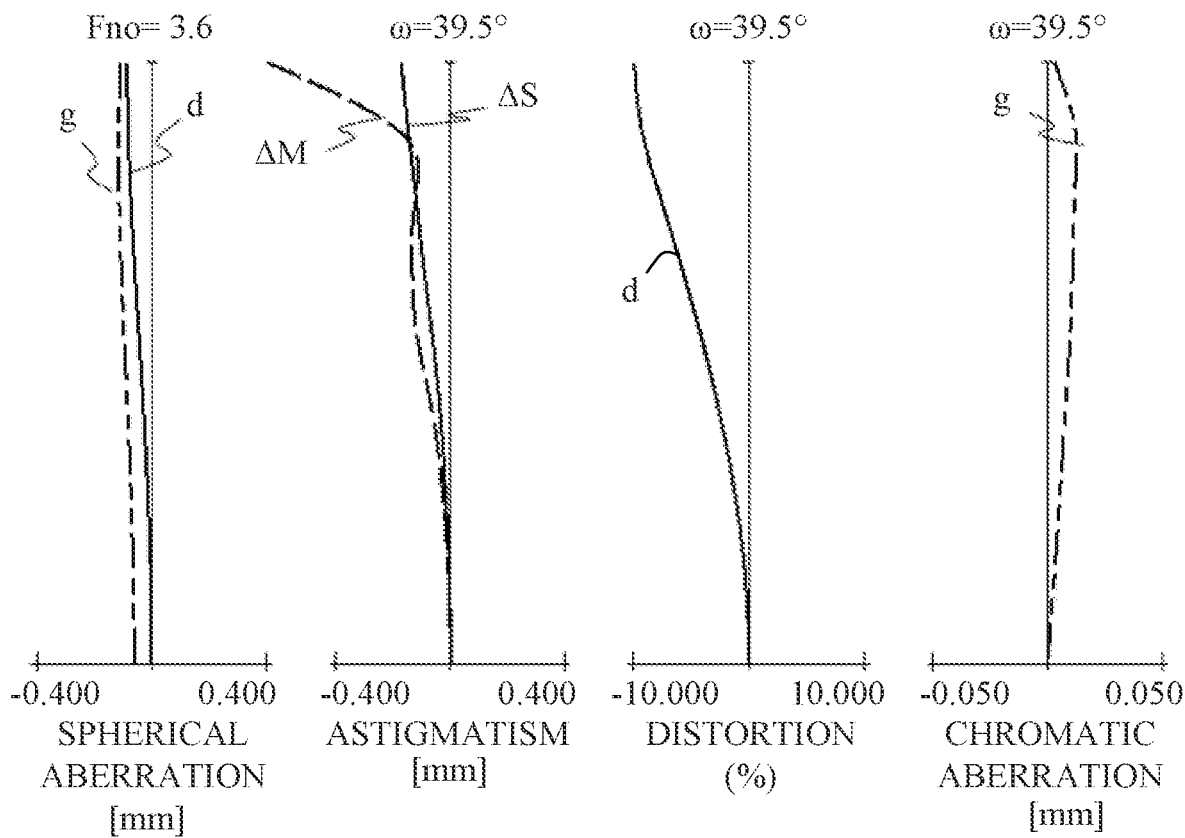
FIGS. 2A to 2C are aberration diagrams of the zoom lens according to Example 1 at a wide-angle end, a middle zoom position, and a telephoto end.
Figure 2B:
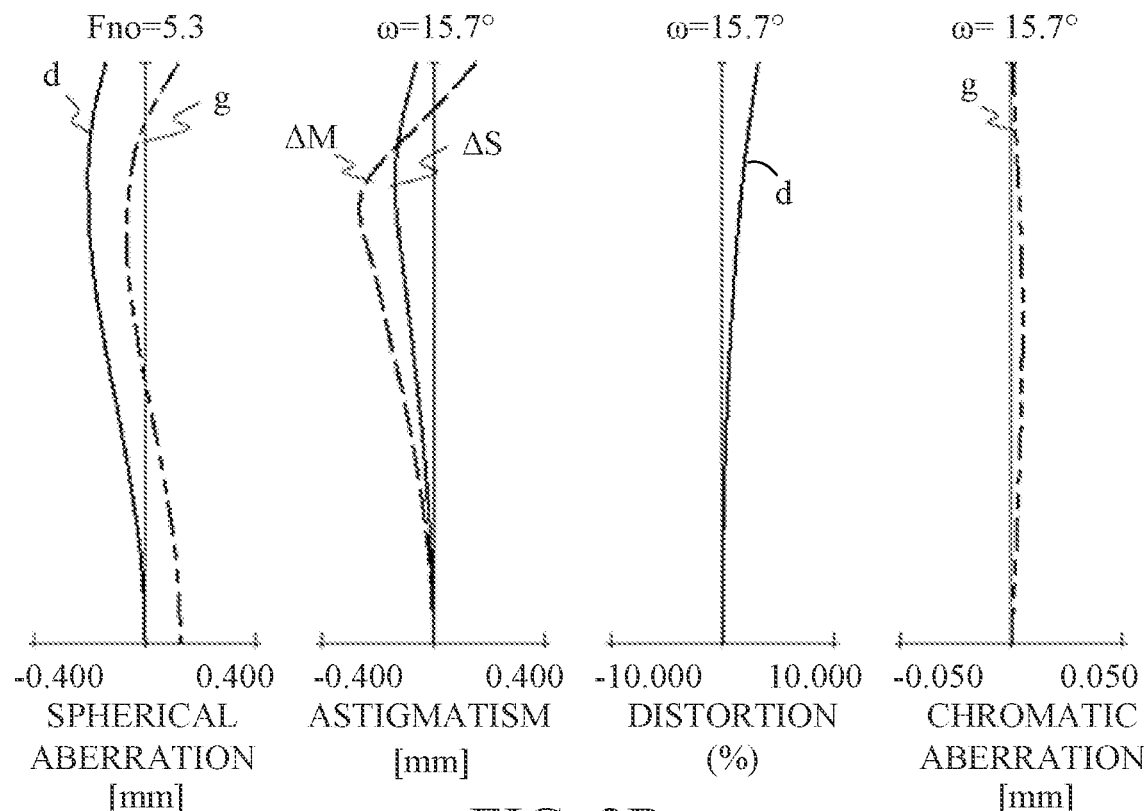
Figure 2C:
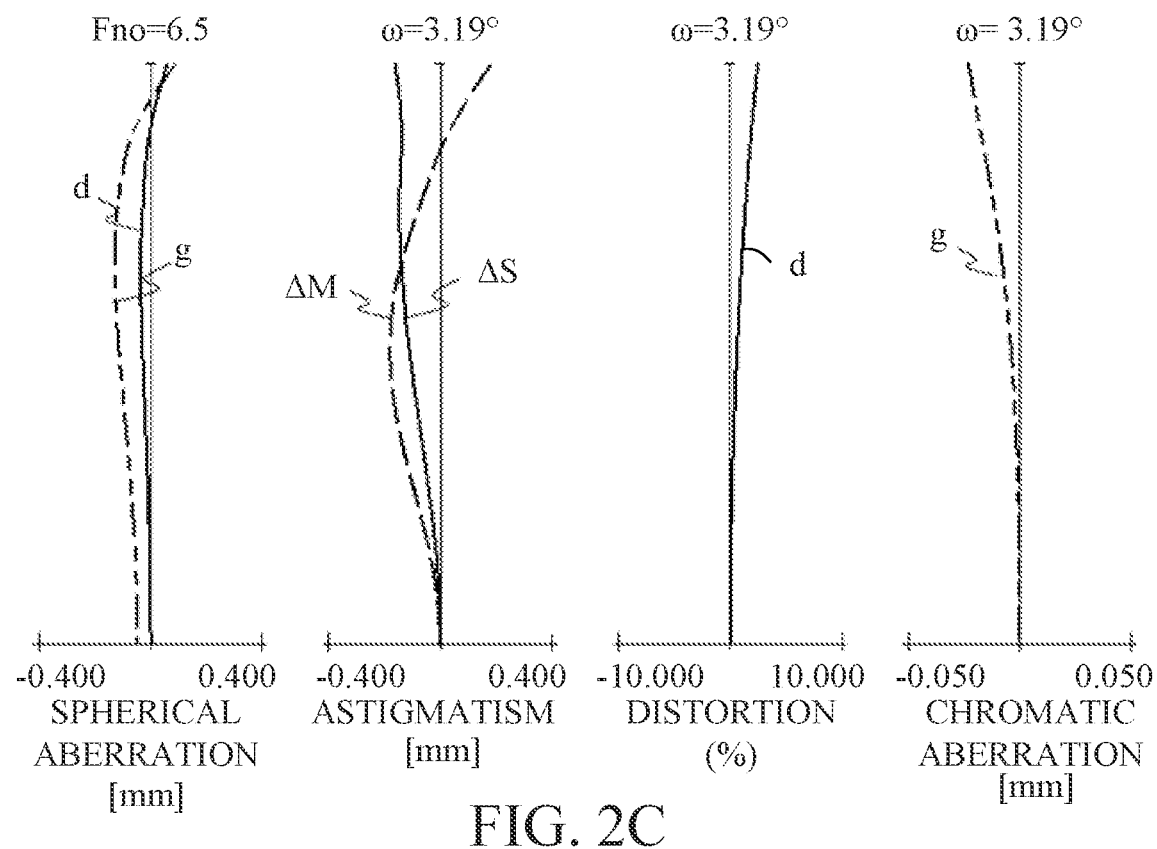

Referring now to the accompanying drawings, a detailed description will be given of embodiments according to the present invention.

FIGS. 1, 3, 5, 7, and 9 are sectional views of zoom lenses (optical systems) L0 according to Examples 1 to 5, respectively, in an in-focus state at infinity. The zoom lens L0 according to each example is an optical system used in an image pickup apparatus such as a digital video camera, a digital still camera, a broadcasting camera, a film-based camera, and a surveillance camera.

In each sectional view, the left side is the object side (front side) and the right side is the image side (rear side). The zoom lens L0 according to each example includes a plurality of lens units. In each sectional view, i represents an order of the lens unit counted from the object side, and Li is an i-th lens unit. In each example, the lens unit is a unit of lenses that integrally moves or stops during zooming. In the zoom lens L0 according to each example, distances between adjacent lens units change during zooming from the wide-angle end to the telephoto end. The lens unit includes one or more lenses. The lens unit may include a diaphragm (aperture stop).

SP represents the diaphragm. In each example, the diaphragm SP is included in the third lens unit L3, but is not limited to this example. IP represents an image plane, and when the zoom lens L0 according to each example is used as an imaging optical system for a digital still camera or a digital video camera, the image plane of the image sensor (photoelectric conversion element) such as a CCD sensor or a CMOS sensor is placed on the image plane IP. When the zoom lens L0 according to each example is used as an imaging optical system for a film-based camera, a photosensitive plane corresponding to a film plane is placed on the image plane IP. In each sectional view, a solid arrow schematically illustrates a moving locus of each lens unit in the in-focus state at infinity during zooming from the wide-angle end to the telephoto end. In each example, the wide-angle end and the telephoto end refer to the zoom positions when each lens unit in the zoom lens L0 is located at both ends of a mechanically movable range on the optical axis OA.

FIGS. 2A to 2C, 4A to 4C, 6A to 6C, 8A to 8C, and 10A to 10C are aberration diagrams of the zoom lenses L0 according to Examples 1 to 5, respectively. In each aberration diagram, FIGS. 2A, 4A, 6A, 8A, and 10A are aberration diagrams of the zoom lens L0 at the wide-angle end. FIGS. 2B, 4B, 6B, 8B, and 10B are aberration diagrams of the zoom lens L0 at the middle zoom position. FIGS. 2C, 4C, 6C, 8C, and 10C are aberration diagrams of the zoom lens L0 at the telephoto end. The spherical aberration diagram with Fno as an F-number illustrates spherical aberration amounts for the d-line (wavelength 587.6 nm) and the g-line (wavelength 435.8 nm). In the astigmatism diagram, ΔS represents an astigmatism amount on the sagittal image plane, and ΔM represents an astigmatism amount on the meridional image plane. The distortion diagram illustrates a distortion amount for the d-line. The chromatic aberration diagram shows a chromatic aberration amount for the g-line. The units for the aberrations are "mm". ω is an imaging half angle of view (degrees).

One conventional zoom lens includes, in order from the object side to the image side, a first lens unit L1 having a positive refractive power, a second lens unit L2 having a negative refractive power, a third lens unit L3 having a positive refractive power, and a plurality of lens units. In this zoom lens, if the power of the first lens unit L1 is increased, the high magnification is easy to realize, but the aberrational fluctuation during zooming and the lateral chromatic aberration at the telephoto end become large, and the high performance is hard to realize. A larger moving amount of the first lens unit L1 would facilitate the magnification, but complicate the mechanism and increase the overall length. It is thus important to properly set the power of the first lens unit L1 in order to achieve both the high magnification and miniaturization of the zoom lens and to realize the high optical performance. It is effective to properly set a configuration and a moving amount of the subsequent lens unit so as to cancel various aberrations generated in the first lens unit L1.

The zoom lenses L0 according to each example include, in order from the object side to the image side, a first lens unit L1 having a positive refractive power, a second lens unit L2, a third lens unit L3 having a positive refractive power, and a rear unit including a plurality of lens units. Arranging a plurality of lens units on the image side of the third lens unit L3 and changing a distance between adjacent lens units during zooming can suppress the aberrational fluctuations during zooming and achieve high performance. In each example, the lens unit includes at least one lens having a power.

The zoom lens L0 according to each example satisfies the following conditional expressions (1), (2), and (3).

$$0.20 < f1/ft < 0.40 \quad (1)$$

$$-4.0 < mr/bfw < -1.5 \quad (2)$$

$$-7.0 < m3/bfw < -2.5 \quad (3)$$

where f1 is a focal length of the first lens L1, ft is a focal length of the overall system of the zoom lens L0 at the telephoto end, mr is a moving amount of the lens unit LR closest to the image plane in the rear unit during zooming from the wide-angle end to the telephoto end, a moving amount from the object side to the image side is positive, bfw is a distance on an optical axis from a surface closest to the image plane of the lens unit LR closest to the image plane in the rear unit at the wide-angle end to the image surface IP (distance in the direction along the optical axis OA), m3 is a moving amount of the third lens unit L3 during zooming from the wide-angle end to the telephoto end, and a moving amount from the object side to the image side is positive.

The conditional expression (1) defines a ratio of the focal length f1 of the first lens unit L1 to the focal length ft of the overall system of the zoom lens L0 at the telephoto end. If the value is higher than the upper limit in the conditional expression (1), the focal length f1 of the first lens unit L1 and thereby the zoom lens L0 become larger. If the value is lower than the lower limit in the conditional expression (1), the focal length f1 of the first lens unit L1 becomes smaller and the aberrational fluctuation generated in the first lens unit L1 becomes larger and the high image quality is hard to realize.

The conditional expression (2) defines a relationship between a moving amount of the lens unit LR and the backfocus. The height of the light beam can be changed by changing the distance from the lens unit LR to the image plane IP during zooming. Therefore, properly setting the relationship between the moving amount of the lens unit LR closest to the image plane during zooming and the backfocus at the wide-angle end can suppress the aberrational fluctuation generated in the first lens unit L1. If the value is lower than the lower limit in the conditional expression (2), the moving amount of the lens unit LR becomes smaller, that is, the absolute value of the moving amount toward the object becomes larger, the height of the light ray passing through the lens unit LR excessively changes, and the aberration is excessively corrected during zooming. If the value is higher than the upper limit in the conditional expression (2), the moving amount of the lens unit LR becomes larger, that is, the absolute value of the moving amount toward the object side becomes smaller, or the absolute value of the moving amount toward the image side becomes larger, and the distance from the lens unit LR to the image plane IP becomes shorter at the telephoto end. As a result, the lens diameter of the lens unit LR becomes larger, and the miniaturization becomes difficult.

The conditional expression (3) defines a relationship between the moving amount of the third lens unit L3 and the backfocus. When the value is lower than the lower limit in the conditional expression (3), the moving amount of the third lens unit L3 becomes smaller, that is, the absolute value of the moving amount of the third lens unit L3 toward the object becomes larger, and the mechanism becomes complicated and larger. If the value is higher than the upper limit in the conditional expression (3), the moving amount of the third lens unit L3 becomes larger, that is, the absolute value of the moving amount toward the object side becomes smaller, and the high magnification becomes difficult to realize.

In each example, the numerical ranges of the conditional expressions (1) to (3) may be set to those of the following conditional expressions (1A) to (3A), respectively.

$$0.24 < f1/ft < 0.38 \quad (1A)$$

$$-3.5 < mr/bfw < -1.6 \quad (2A)$$

$$-6.0 < m3/bfw < -2.7 \quad (3A)$$

In each example, the numerical ranges of the conditional expressions (1) to (3) may be set to those of the following conditional expressions (1B) to (3B), respectively.

$$0.26 < f1/ft < 0.36 \quad (1B)$$

$$-2.9 < mr/bfw < -1.7 \quad (2B)$$

$$-5.7 < m3/bfw < -2.9 \quad (3B)$$

A description will now be given of a configuration that the zoom lens L0 according to each example may take. In the zoom lens L0 according to each example, the diaphragm SP may be disposed in the third lens unit L3. Thereby, the front lens unit diameter can be easily suppressed. The first lens unit L1 may have one negative lens and three positive lenses arranged in order from the object side to the image side. Thereby, it becomes easy to suppress the aberration generated in the first lens unit L1 while strengthening the refractive power (power) of the first lens unit L1. In the zoom lens L0 according to each example, the lens unit LR may include a single lens. Thereby, the weight of the lens unit LR can be easily reduced, and the mechanism can become simple and advantageous for miniaturization.

The zoom lens L0 according to each example may satisfy at least one of the following conditional expressions (4) to (10):

$$0.3 < fr/f1 < 2.8 \quad (4)$$

$$-9.0 < f1/f2 < -3.5 \quad (5)$$

$$-1.2 < m1/f1 < -0.4 \quad (6)$$

$$3.0 < \beta 2t/\beta 2w < 12.0 \quad (7)$$

$$2.0 < dpw/fw < 7.0 \quad (8)$$

$$0.4 < Lt/ft < 1.2 \quad (9)$$

$$15.0 < VdLR < 50.0 \quad (10)$$

where fr is a focal length of the lens unit LR, f2 is a focal length of the second lens unit L2, and m1 is a moving amount of the first lens unit L1 during zooming from the wide-angle end to the telephoto end. A moving amount from the object side to the image side is positive, β2t is a lateral magnification of the second lens unit L2 at the telephoto end, β2w is a lateral magnification of the second lens unit L2 at the wide-angle end, dpw is a distance on the optical axis from the diaphragm SP at the wide-angle end to the image plane IP, and fw is a focal length of the overall system of the zoom lens L0 at the wide-angle end. Lt is a distance on the optical axis from the surface closest to the object of the zoom lens L0 to the image plane IP at the telephoto end. VdLR is an Abbe number of the lenses constituting the lens unit LR.

The conditional expression (4) defines a ratio of the focal length fr of the lens unit LR to the focal length f1 of the first lens unit L1. When the lens unit LR has a positive refractive power, and its power arrangement symmetrical with respect to the diaphragm SP, the aberration can be easily corrected. Setting the focal length fr of the lens unit LR to have a proper relationship with the focal length f1 of the first lens unit L1 can easily reduce various aberrations, particularly, the lateral chromatic aberration and the distortion. If the value is higher than the upper limit in the conditional expression (4), the focal length fr of the lens unit LR becomes larger, the aberration correction effect becomes insufficient, and it becomes difficult to reduce various aberrations, particularly, the lateral chromatic aberration and the distortion. If the value is lower than the lower limit in the conditional expression (4), the focal length fr of the lens unit LR becomes smaller, the exit pupil position at the telephoto end becomes distant from the image plane, and the lens diameter of the lens unit LR and thus the zoom lens L0 become larger. In addition, the lens unit LR may move so as to have a convex locus toward the object during zooming from the wide-angle end to the telephoto end (or it may move to the object side and then to the image side). Thereby, it becomes easy to maximize the aberration correction effect of the lens unit LR. The locus convex toward the object is a locus in which during zooming from the wide-angle end to the telephoto end with reference to the paraxial image plane position, the lens unit LR moves to the object side during zooming from the wide-angle end to the middle zoom position, and moves to the image side during zooming from the middle zoom position to the telephoto end.

The conditional expression (5) defines a ratio of the focal length f1 of the first lens unit L1 to the focal length f2 of the second lens unit L2. Properly setting the relationship can easily suppress the front lens diameter and reduce the overall length. If the value is higher than the upper limit in the conditional expression (5), the focal length f1 of the first lens unit L1 becomes smaller, the absolute value of the focal length f2 of the second lens unit L2 becomes larger, and the entrance pupil position at the wide-angle end is too far from the surface closest to the object. Therefore, the front lens diameter becomes large. If the value is lower than the lower limit in the conditional expression (5), the first focal length f1 of the lens unit L1 becomes larger, and the absolute value of the focal length f2 of the second lens unit L2 becomes smaller. As a result, the moving amount of the first lens unit L1 required for zooming becomes larger and the overall length becomes longer.

The conditional expression (6) defines a relationship between the moving amount m1 and the focal length f1 of the first lens unit L1. Properly setting the relationship can easily provide the high magnification and miniaturization. If the value is higher than the upper limit in the conditional expression (6), the focal length f1 of the first lens unit L1 becomes smaller, or the absolute value of the movement amount m1 becomes larger, and the overall length becomes longer. If the value is lower than the lower limit in the conditional expression (6), the focal length f2 of the second lens unit L2 becomes larger, or the absolute value of the moving amount m1 of the first lens unit L1 becomes smaller, and the high magnification is difficult to achieve.

The conditional expression (7) defines a relationship between the lateral magnification at the wide-angle end and the lateral magnification at the telephoto end of the second lens unit L2. Properly setting the relationship can easily realize the high magnification and high performance. If the value is higher than the upper limit in the conditional expression (7), the absolute value of the lateral magnification at the telephoto end becomes larger, or the absolute value of the lateral magnification at the wide-angle end becomes smaller, and the lateral magnification excessively changes. Therefore, it is difficult to correct various aberrations, and it is difficult to suppress fluctuations, particularly, in spherical aberration and astigmatism. If the value is lower than the lower limit in the conditional expression (7), the absolute value of the lateral magnification at the telephoto end becomes smaller, or the absolute value of the lateral magnification at the wide-angle end becomes smaller, and the change in the lateral magnification becomes too small. Therefore, the high magnification becomes difficult to realize.

The conditional expression (8) defines a relationship between the position of the diaphragm SP and the position of the image plane IP at the wide-angle end. Since the off-axis light beam angle is high at the wide-angle end, properly setting the position of the diaphragm SP is important in order to suppress the front lens diameter and the rear lens diameter. If the value is higher than the upper limit in the conditional expression (8), the distance from the diaphragm SP to the image plane IP becomes longer, the rear lens diameter and thereby the zoom lens L0 become larger. If the value is lower than the lower limit in the conditional expression (8), the distance from the aperture stop SP to the image plane IP becomes shorter, the front lens diameter and thereby the zoom lens L0 become larger.

The conditional expression (9) defines a ratio of the overall length to the focal length of the zoom lens L0 at the telephoto end. Properly setting the ratio of the overall length to the focal length of the zoom lens L0 can easily achieve both the shortened overall length and the high image quality. If the value is higher than the upper limit in the conditional expression (9), the zoom lens L0 becomes longer and larger. If the value is lower than the lower limit in the conditional expression (9), the overall length of the zoom lens L0 becomes shorter and it becomes difficult to correct various aberrations, particularly, the spherical aberration, the lateral chromatic aberration, and the coma at the telephoto end.

The conditional expression (10) defines the Abbe number of the lenses in the lens unit LR. When the Abbe number is higher than the upper limit in the conditional expression (10), the lateral chromatic aberration generated in the lens unit LR becomes smaller, it becomes difficult to cancel the lateral chromatic aberration generated in the first lens unit L1 and thereby to improve the image quality. If the Abbe number is lower than the lower limit in the conditional expression (10), the color shift sensitivity during eccentricity becomes larger, and the required accuracy during assembly becomes excessively high.

In each example, the numerical ranges of the conditional expressions (4) to (10) may be set those of the following conditional expressions (4A) to (10A), respectively.

$$0.5 < fr/f1 < 1.9 \tag{4A}$$

$$-8.0 < f1/f2 < -4.5 \tag{5A}$$

$$-1.0 < m1/f1 < -0.5 \tag{6A}$$

$$4.2 < \beta 2t/\beta 2w < 9.0 \tag{7A}$$

$$2.5 < dpw/fw < 5.5 \tag{8A}$$

$$0.5 < Lt/ft < 0.9 \tag{9A}$$

$$20.0 < VdLR < 46.0 \tag{10A}$$

In each example, the numerical ranges of the conditional expressions (4) to (10) may be set to those of the following conditional expressions (4B) to (10B), respectively.

$$0.6 < fr/f1 < 1.5 \tag{4B}$$

$$-6.8 < f1/f2 < -5.3 \tag{5B}$$

$$-0.9 < m1/f1 < -0.6 \tag{6B}$$

$$4.6 < \beta 2t/\beta 2w < 8.5 \tag{7B}$$

$$3.0 < dpw/fw < 4.7 \tag{8B}$$

$$0.55 < Lt/ft < 0.85 \tag{9B}$$

$$25.0 < VdLR < 41.0 \tag{10B}$$

Next follows a detailed description of the zoom lens L0 according to each example.

Figure 3:
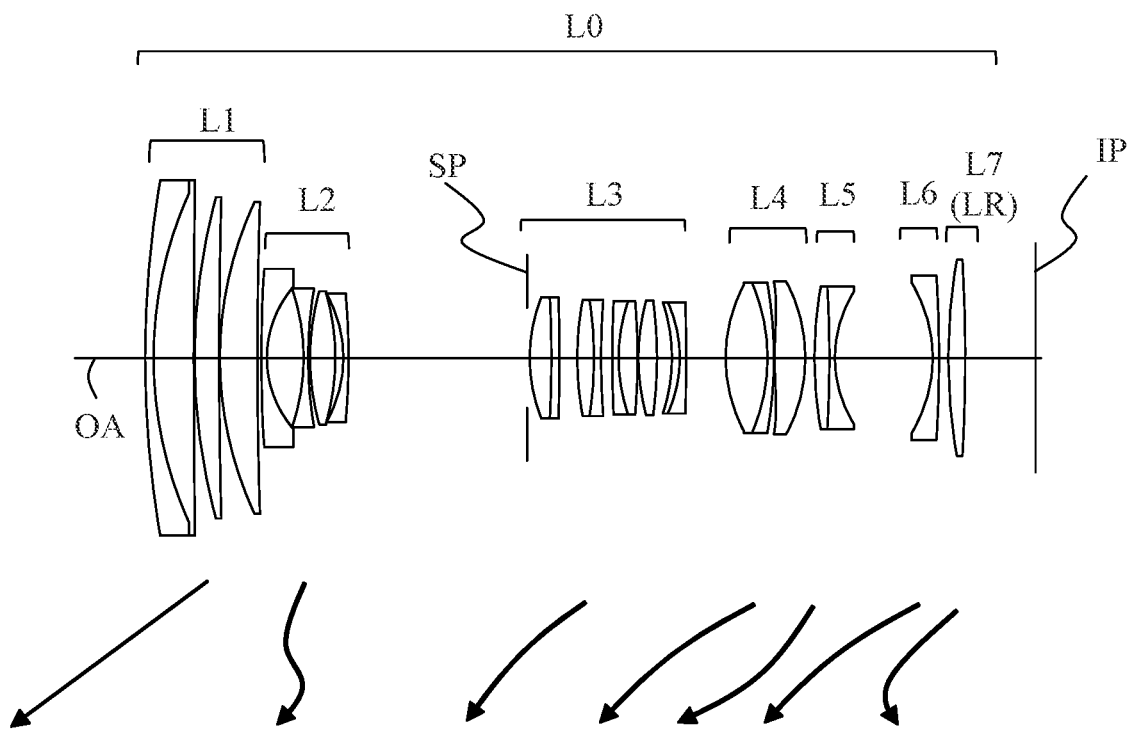
FIG. 3 is a sectional view of a zoom lens according to Example 2.
Figure 4A:
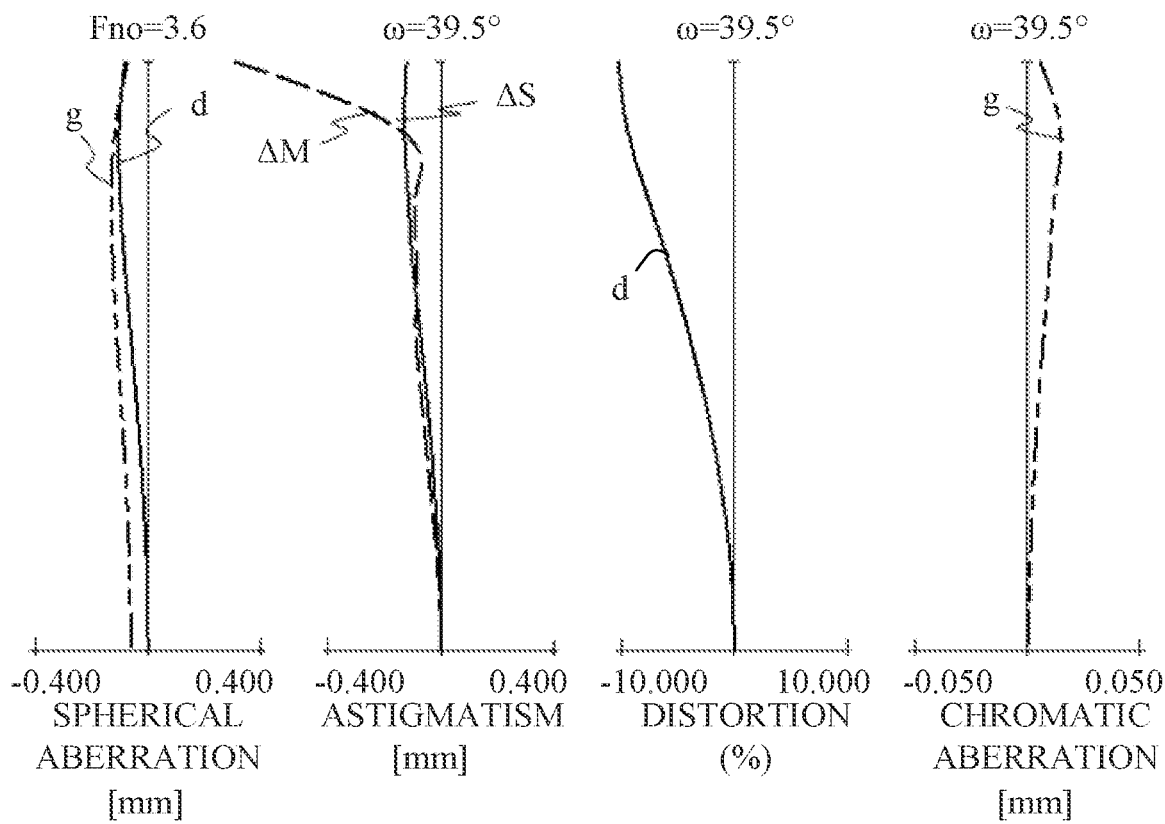
FIGS. 4A to 4C are aberration diagrams of the zoom lens according to Example 2 at a wide-angle end, an intermediate zoom position, and a telephoto end.
Figure 4B:
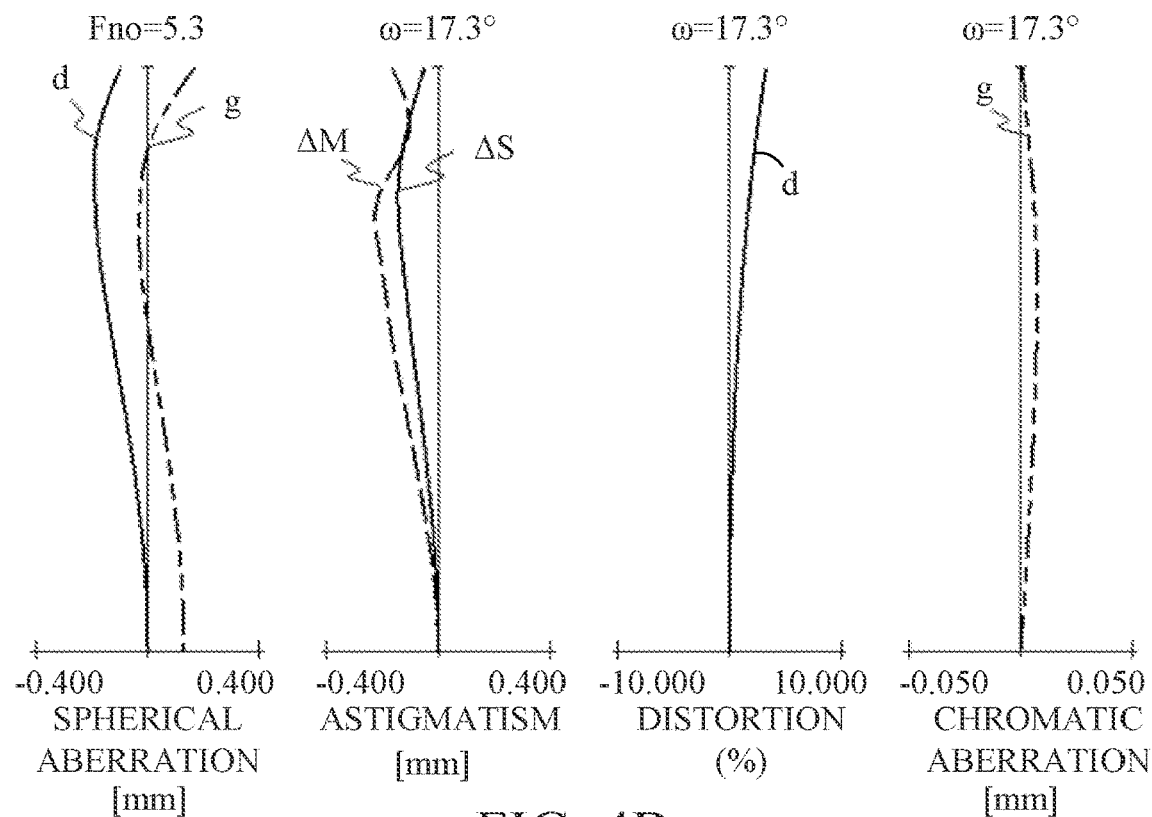
Figure 4C:
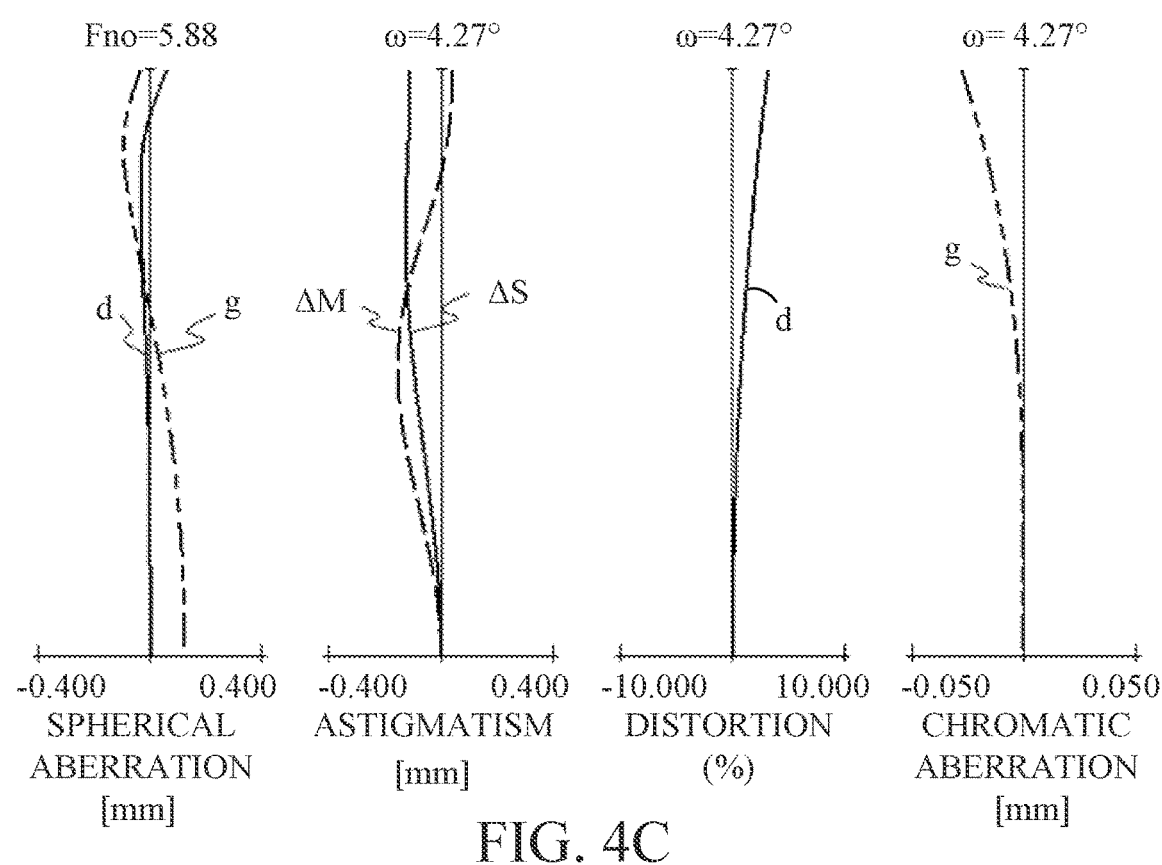
Figure 5:
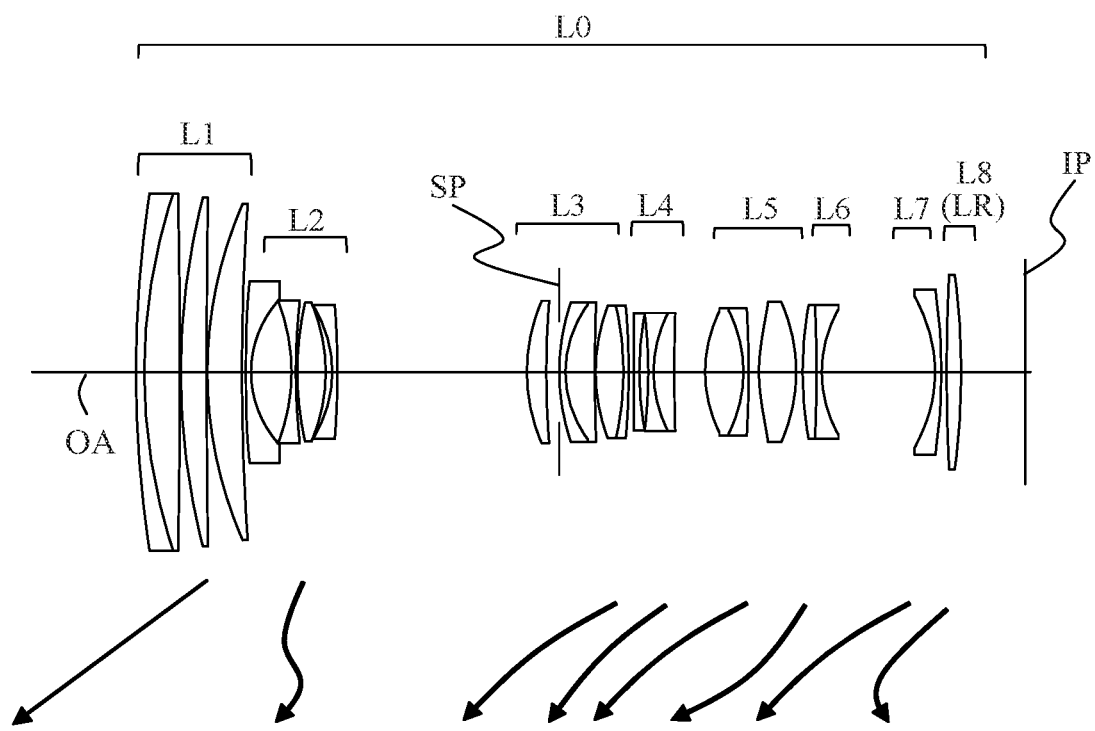
FIG. 5 is a sectional view of a zoom lens according to Example 3.
Figure 6A:
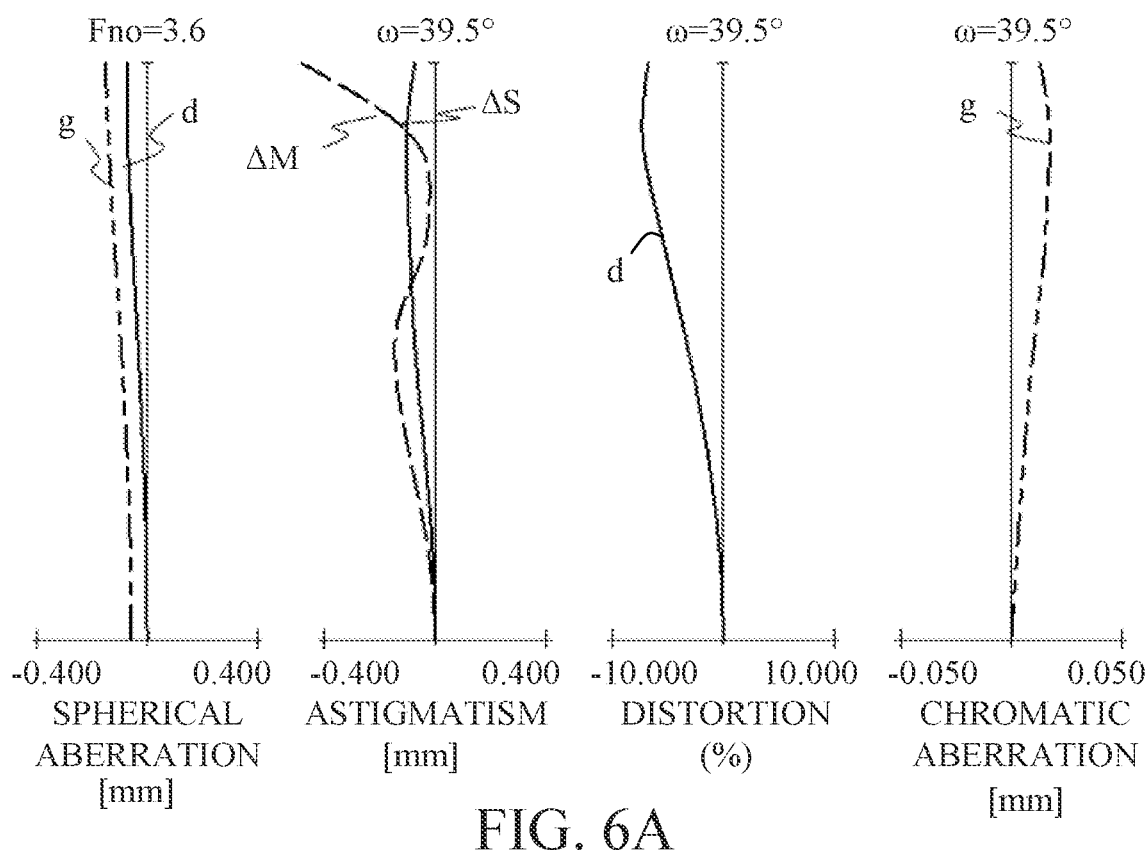
FIGS. 6A to 6C are aberration diagrams of the zoom lens according to Example 3 at a wide-angle end, an intermediate zoom position, and a telephoto end.
Figure 6B:
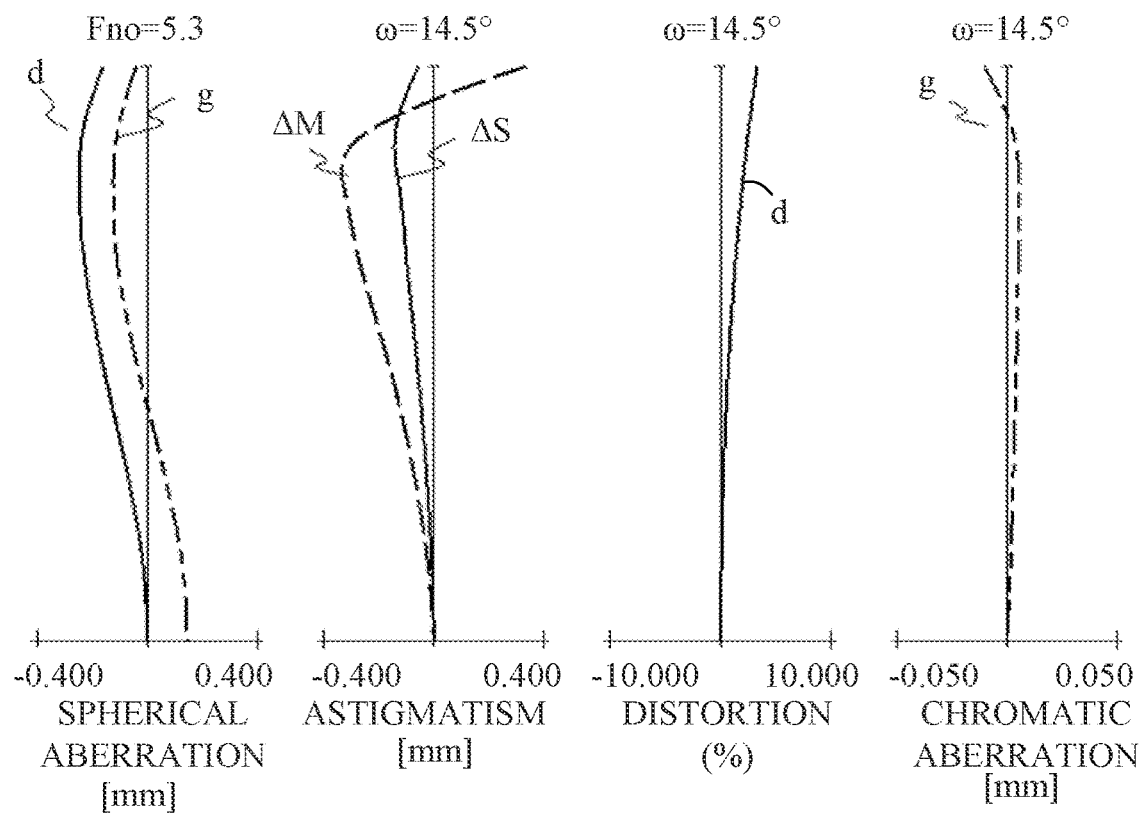
Figure 6C:
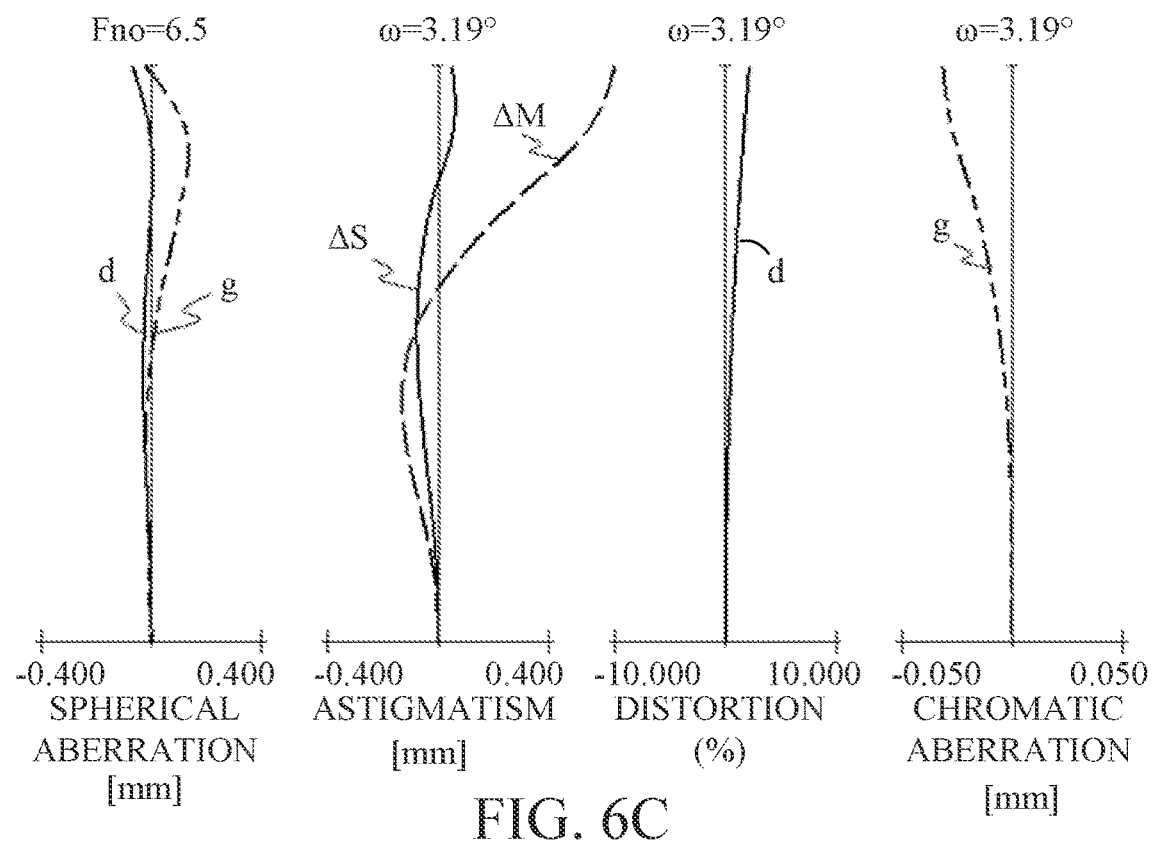
Figure 7:
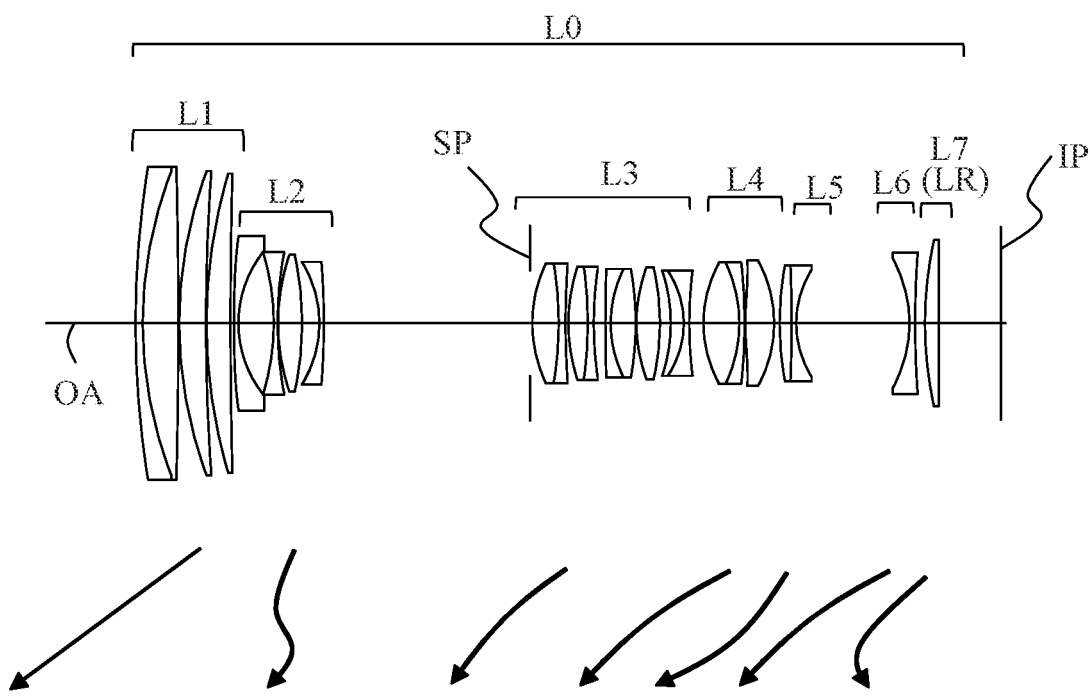
FIG. 7 is a sectional view of a zoom lens according to Example 4.
Figure 8A:
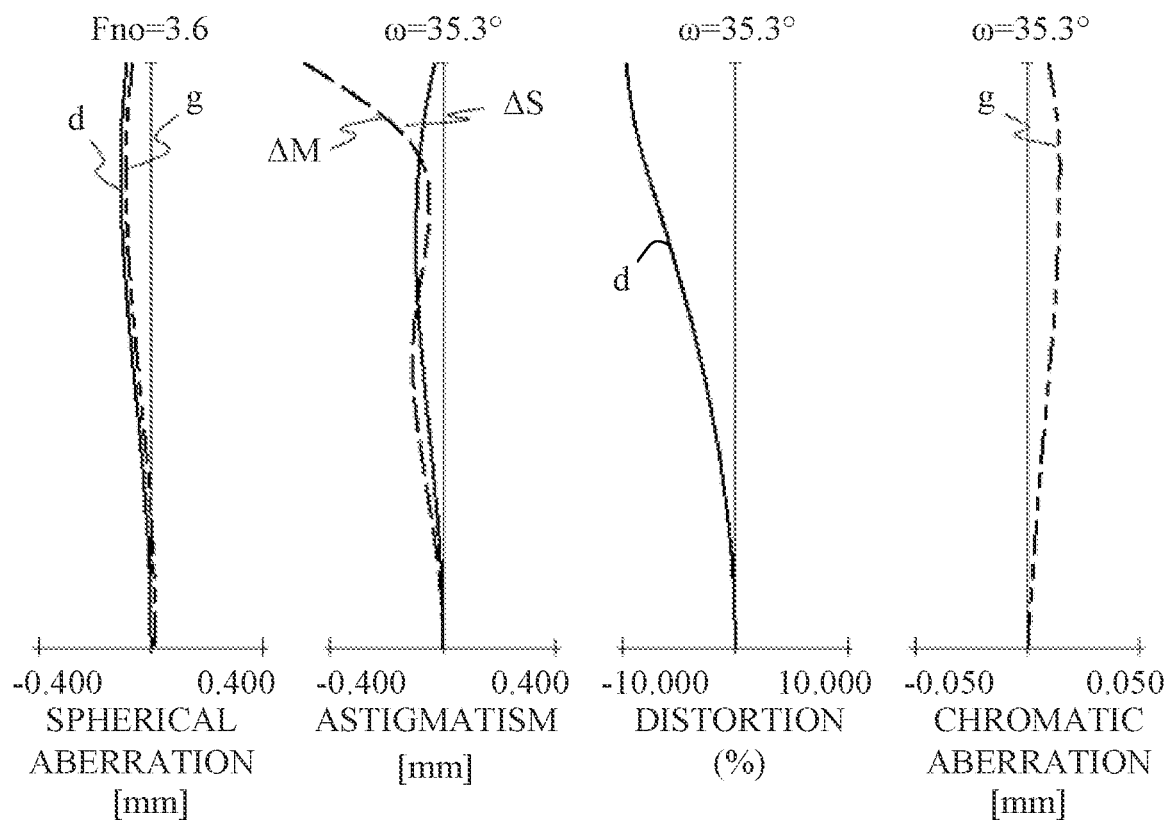
FIGS. 8A to 8C are aberration diagrams of the zoom lens according to Example 4 at a wide-angle end, an intermediate zoom position, and a telephoto end.
Figure 8B:
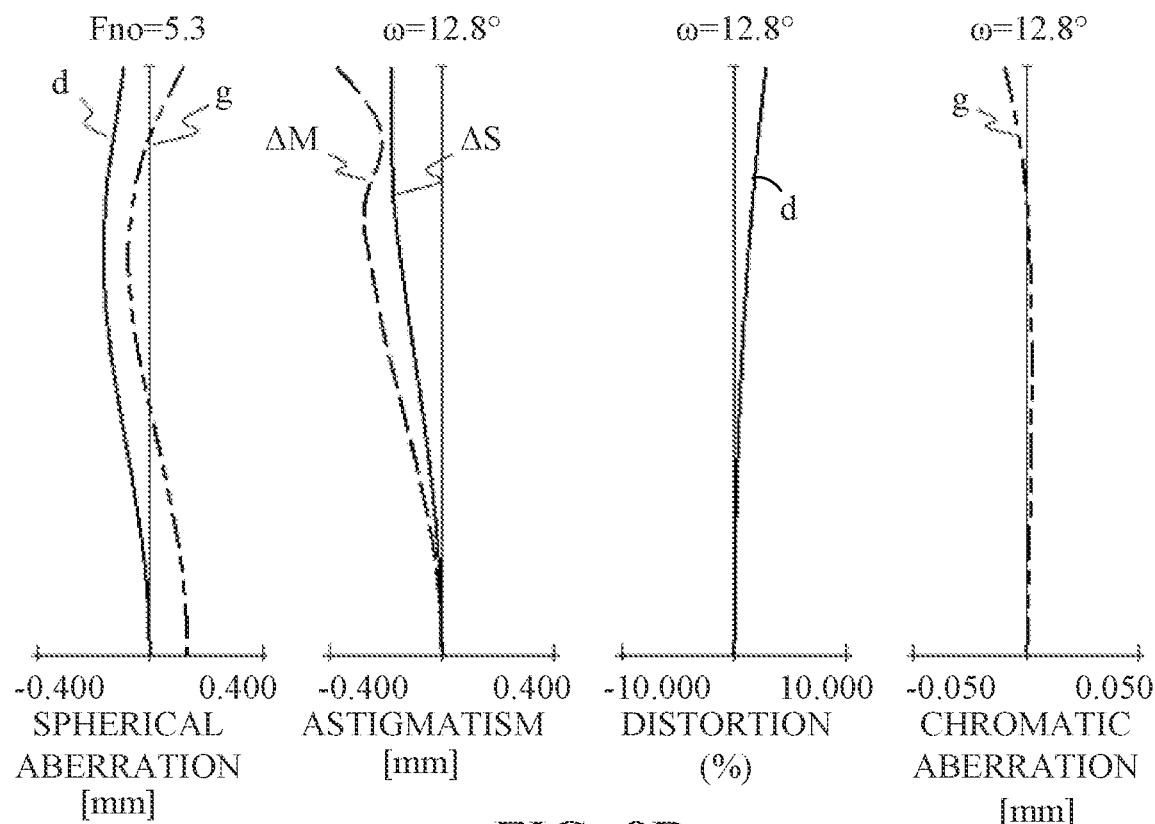
Figure 8C:
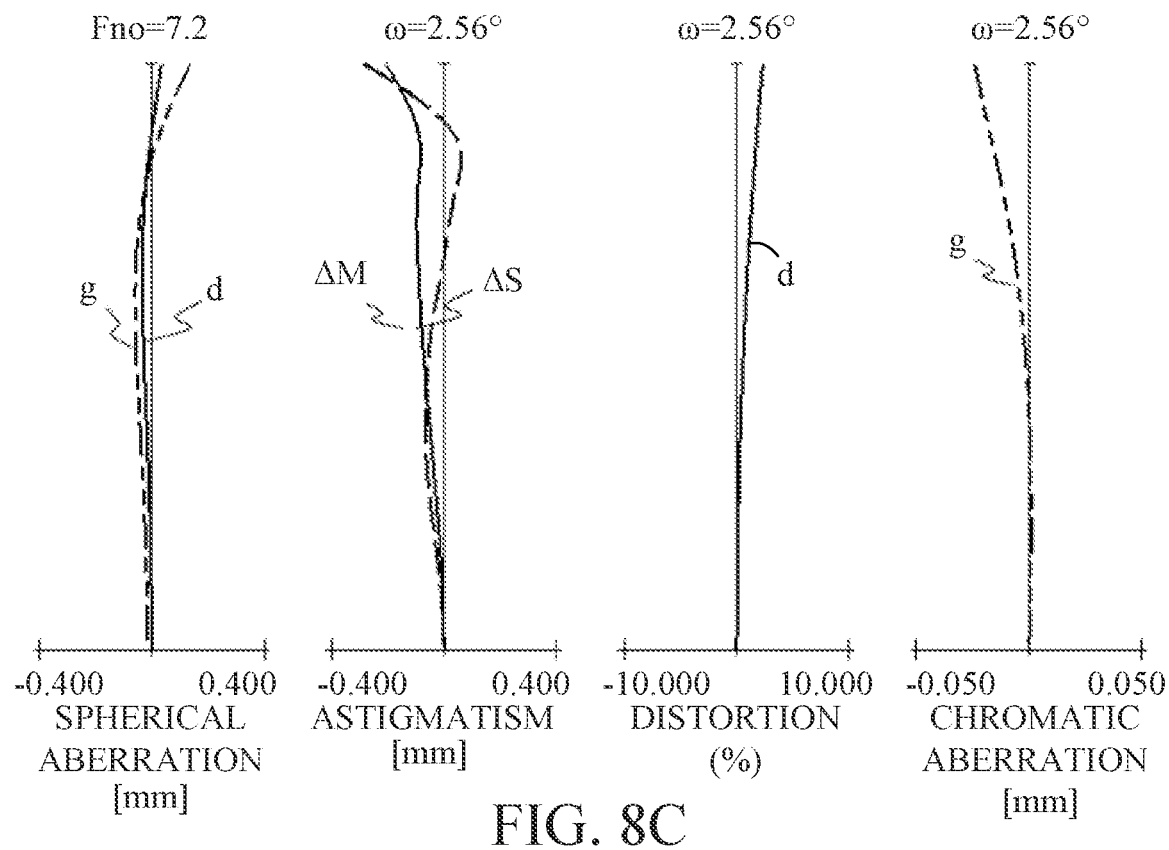

As illustrated in FIGS. 1, 3, and 7, the zoom lenses L0 according to Examples 1, 2, and 4 include, in order from the object side to the image side, a first lens unit L1 having a positive refractive power, a second lens unit L2 having a negative refractive power, and a third lens unit L3 having a positive refractive power. The zoom lens L0 according to Example 1 further includes a fourth lens unit L4 having a positive refractive power, a fifth lens unit L5 having a negative refractive power, a sixth lens unit L6 having a negative refractive power, and a seventh lens unit L7 having a positive optical power. The fourth lens unit L4, the fifth lens unit L5, the sixth lens unit L6, and the seventh lens unit L7 correspond to a plurality of lens units disposed on the image side of the third lens unit L3. The seventh lens unit L7 corresponds to the lens unit LR. During zooming from the wide-angle end to the telephoto end, distances between adjacent lens units change. Changing the distance between the third lens unit L3 and the fourth lens unit L4 can suppress fluctuations, particularly, in astigmatism. Changing the distance between the fourth lens unit L4 and the fifth lens unit L5 can suppress fluctuations, particularly, in coma. Changing the distance between the fifth lens unit L5 and the sixth lens unit L6 can suppress fluctuations, particularly, in distortion. Changing the distance between the sixth lens unit L6 and the seventh lens unit L7 can suppress fluctuations, particularly, in lateral chromatic aberration. Changing the distances among the plurality of lens units can satisfactory correct various aberrations in the overall zoom range.

As illustrated in FIG. 3, the zoom lens L0 according to Example 3 includes, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power, a seventh lens unit L7 having a negative refractive power, and an eighth lens unit L8 having a positive refractive power. In the zoom lens L0 according to Example 3, the eighth lens unit L8 corresponds to the lens unit LR. During zooming from the wide-angle end to the telephoto end, distances between adjacent lens units change. Changing the distance between the third lens unit L3 and the fourth lens unit L4 can suppress fluctuations, particularly, in astigmatism. Changing the distance between the fourth lens unit L4 and the fifth lens unit L5 can suppress fluctuations, particularly, in spherical aberration. Changing the distance between the fifth lens unit L5 and the sixth lens unit L6 can suppress fluctuations, particularly, in coma. Changing the distance between the sixth lens unit L6 and the seventh lens unit L7 can suppress fluctuations, particularly, in distortion. Changing the distance between the seventh lens unit L7 and the eighth lens unit L8 can suppress fluctuations, particularly, in lateral chromatic aberration. Changing the distances among the plurality of lens units can satisfactorily correct various aberrations in the overall zoom range. The third lens unit L3 and the fifth lens unit L5 move in the same locus during zooming from the wide-angle end to the telephoto end. Thereby, a simple mechanism can be realized.

Figure 9:
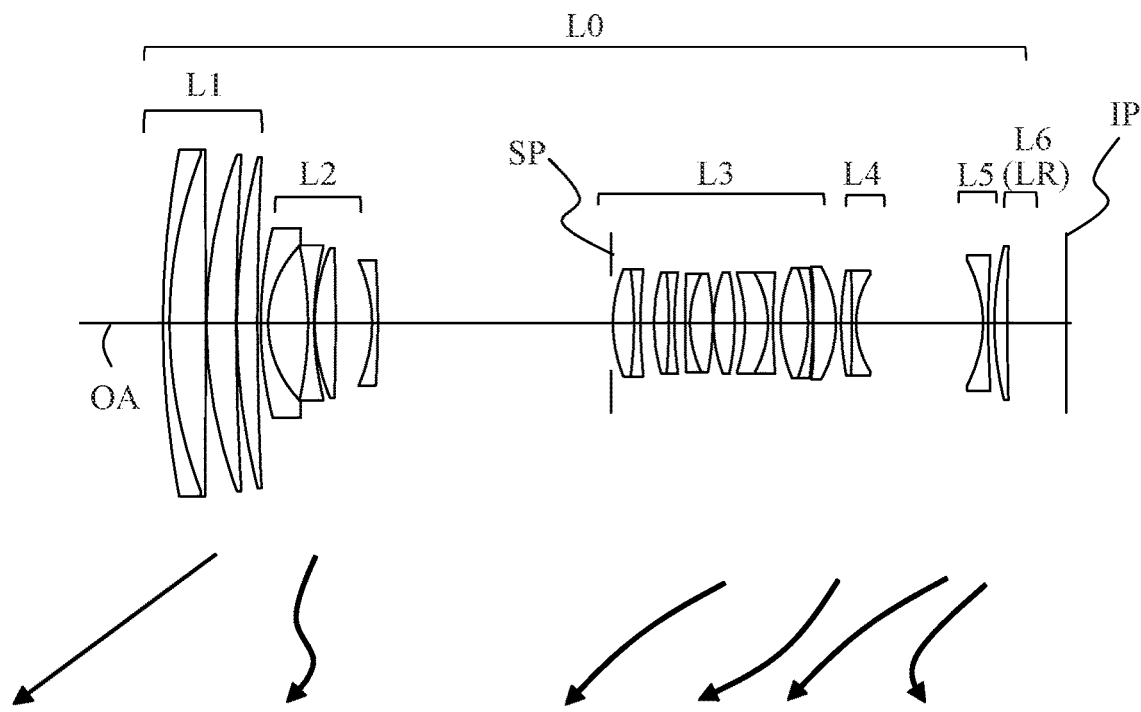
FIG. 9 is a sectional view of a zoom lens according to Example 5.
Figure 10A:
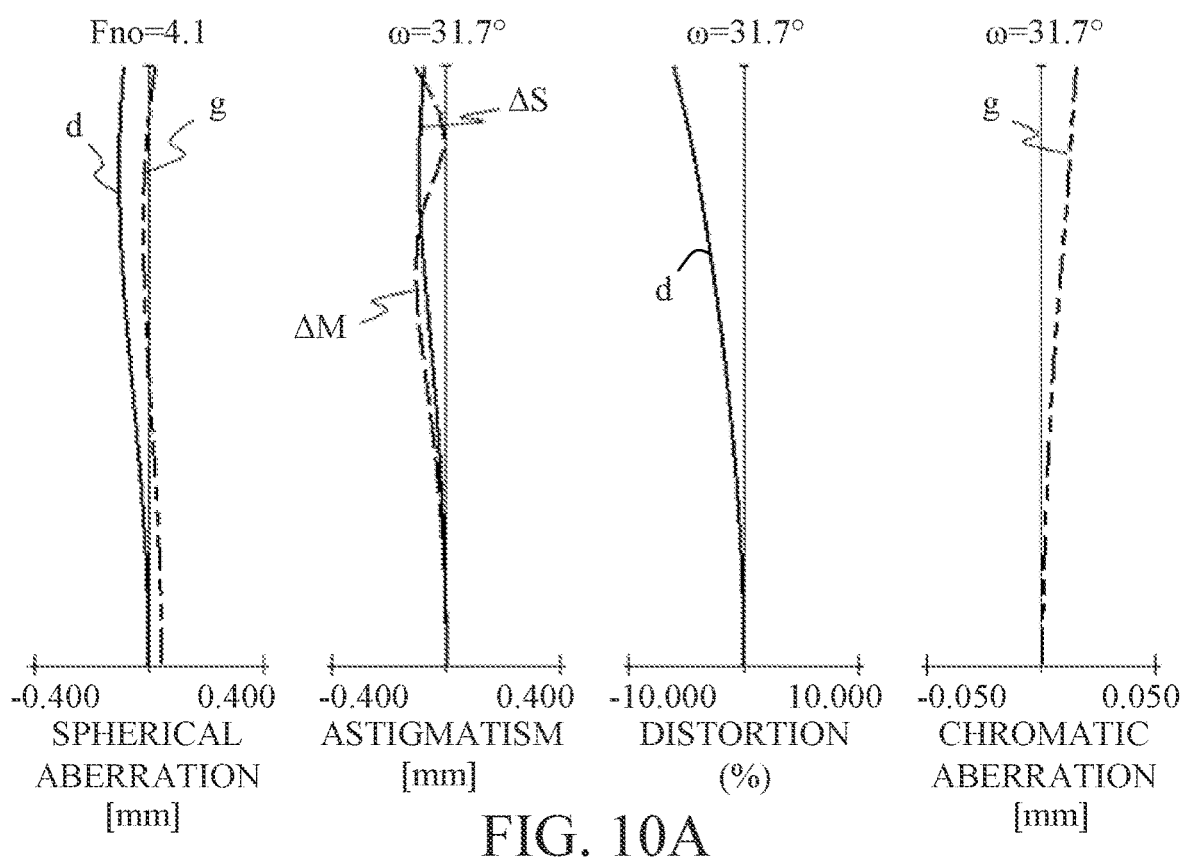
FIGS. 10A to 10C are aberration diagrams of the zoom lens according to Example 5 at a wide-angle end, an intermediate zoom position, and a telephoto end.
Figure 10B:
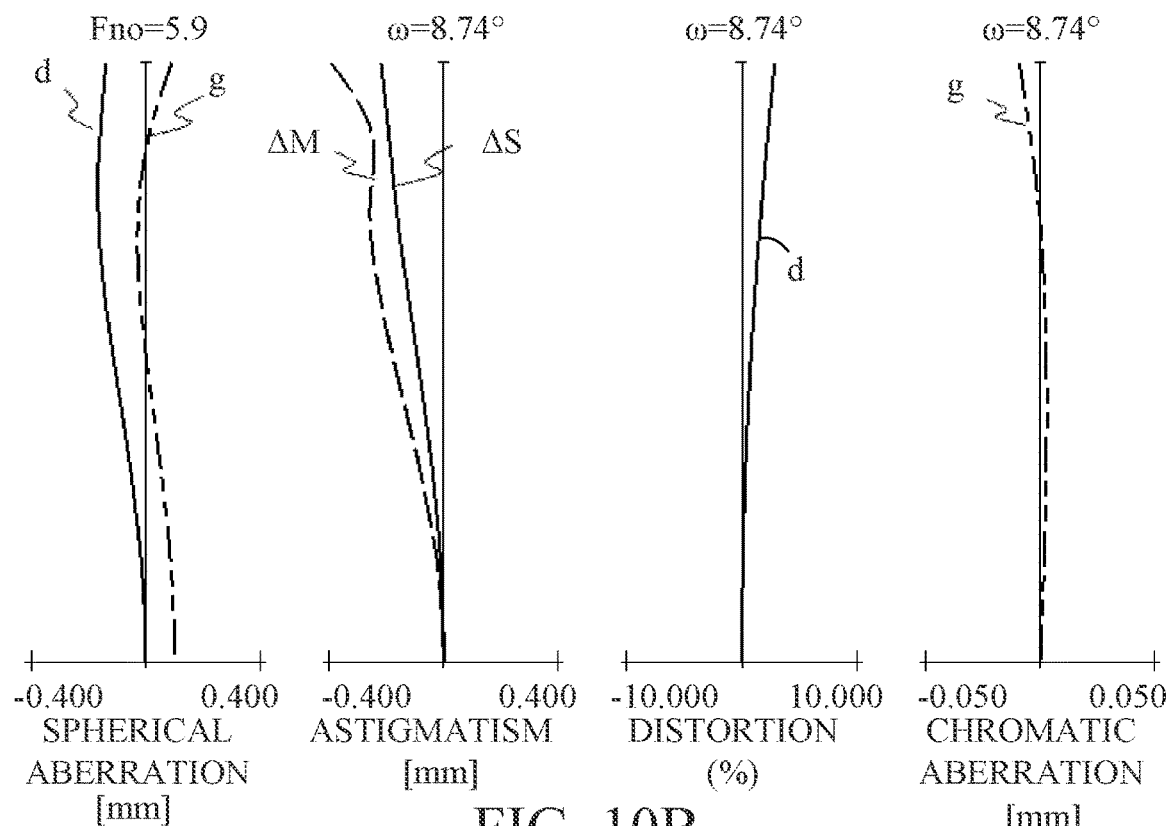
Figure 10C:
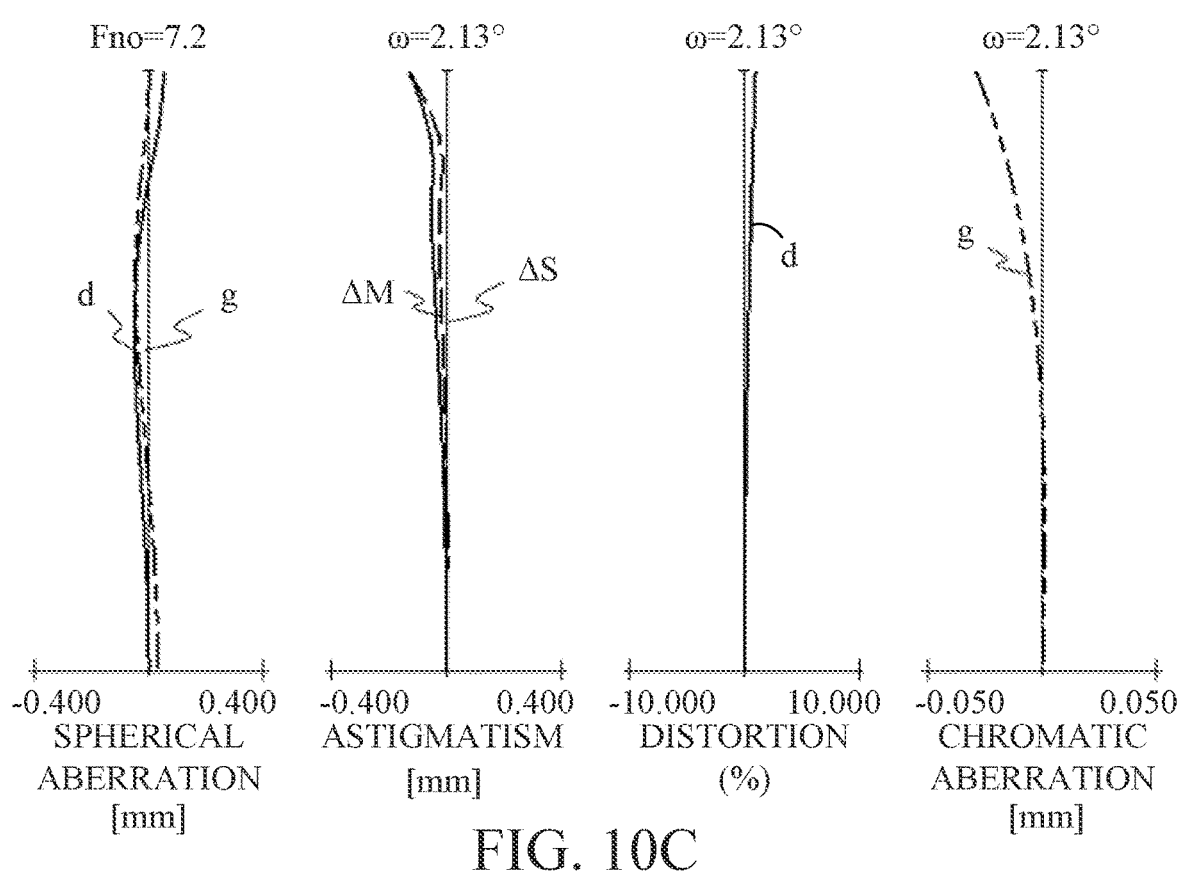

As illustrated in FIG. 9, the zoom lens L0 according to Example 5 includes, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a negative refractive power, and a sixth lens unit L6 having a positive refractive power. In the zoom lens L0 according to Example 5, the sixth lens unit L6 corresponds to the lens unit LR. During zooming from the wide-angle end toward the telephoto end, distances between adjacent lens units change. Changing the distance between the third lens unit L3 and the fourth lens unit L4 can suppress changes of the aberrations, particularly, in coma. Changing the distance between the fourth lens unit L4 and the fifth lens unit L5 can suppress changes of the aberrations, particularly, in distortion. Changing the distance between the fifth lens unit L5 and the sixth lens unit L6 can suppress changes of the aberrations, particularly, in lateral chromatic aberration. Changing the distances among the plurality of lens units can satisfactorily correct various aberrations in the overall zoom range.

Thus, arranging a plurality of lens units on the image side of the third lens unit L3 and changing the distances among the plurality of lens units can satisfactorily correct various aberrations in the overall zoom range. In particular, arranging at least three lens units as the plurality of lens units disposed on the image side of the third lens unit L3 can satisfactorily correct various aberrations. The configuration of the plurality of lens units is not limited to that of each example. For example, integrally moving the fourth lens unit L4 and the fifth lens unit L5 according to Example 1 can simplify the mechanism. Dividing the third lens unit L3 in Example 1 and changing the distance between the lens units can further reduce the spherical aberration fluctuation and improve the image quality.

The zoom lenses L0 according to Examples 1 to 5 may provide an image stabilization by moving part of the zoom lens L0 in a direction including a component in a direction orthogonal to the optical axis OA. In particular, setting the part to be moved during the image stabilization to the whole or part of the third lens unit L3 or the fourth lens unit L4 having a relatively small diameter can make compact the actuator for driving and thereby the lens apparatus including the zoom lens L0.

Numerical examples 1 to 5 corresponding to Examples 1 to 5 will be shown below. In surface data according to each numerical example, r represents a radius of curvature of each optical surface, and d (mm) represents an on-axis distance (distance on the optical axis) between an m-th surface and an (m+1)-th surface, where m is a number of a surface counted from the light incident side. Moreover, nd represents a refractive index of each optical element for the d-line, and vd represents an Abbe number of the optical element. The Abbe number vd of a certain material is expressed as vd=(Nd−1)/(NF−NC) where Nd, NF, and NC are refractive indexes for the d-line (587.6 nm), the F-line (486.1 nm), and the C-line (656.3 nm) in the Fraunhofer line.

In each numerical example, d, focal length (mm), F-number, and half angle of view (degree) have values when the optical system according to each example focuses on an object at infinity. BF (backfocus) is a distance on the optical axis from the final surface of the lens (the lens surface closest to the image plane) to the paraxial image plane in terms of the air equivalent length. The overall lens length is a length obtained by adding the backfocus to the distance on the optical axis from the frontmost surface (lens surface closest to the object) of the zoom lens to the final surface. The lens unit may include one or more lenses. When the optical surface is an aspherical surface, a * symbol is attached to the right side of the surface number. The aspherical shape is given as follows:

$$X = \frac{(1/R)}{1+\sqrt{1-(1+K)(H/R)^2}} + A_2H^2 + A_4H^4 + A_6H^6 + A_8H^8 + A_{10}H^{10} + A_{12}H^{12}$$

where X is a displacement amount from a surface apex in the optical axis direction, H is a height from the optical axis in a direction orthogonal to the optical axis, R is a paraxial radius of curvature, K is a conical constant, A2, A4, A6, A8, A10, and A12 are aspherical coefficients.

In each aspherical coefficient, "e-x" means "$10^{-x}$." In addition to specifications such as the focal length and F-number, the angle of view is the half angle of view (degree) of the overall system, the image height is the maximum image height that determines the half angle of view, and the overall lens length is a distance from the first lens surface to the image plane. The half angle of view describes the paraxial calculation value calculated from the focal length and the image height. The backfocus BF indicates a length from the final lens surface to the image plane. Each lens unit data shows the focal length of each lens unit.

An item (variable) at a distance d according to each optical surface changes during zooming, and the surface distance (separation) according to the focal length is shown in Table 1. Table 1 shows calculation results according to each conditional expression based on the lens data of numerical examples 1 to 5.

Numerical Example 1

| Surface Data | | | | |
|---|---|---|---|---|
| Surface Number | r | d | nd | vd |
| 1 | 255.425 | 1.60 | 1.87070 | 40.7 |
| 2 | 85.494 | 7.53 | 1.43875 | 94.7 |
| 3 | −1859.867 | 0.15 | | |

-continued

| Surface Data | | | | |
|---|---|---|---|---|
| 4 | 115.473 | 4.70 | 1.49700 | 81.5 |
| 5 | 757.187 | 0.15 | | |
| 6 | 81.241 | 6.72 | 1.53775 | 74.7 |
| 7 | 1516.193 | (Variable) | | |
| 8* | 2688.270 | 1.00 | 1.88300 | 40.8 |
| 9 | 21.226 | 7.81 | | |
| 10 | −39.142 | 0.80 | 1.72916 | 54.7 |
| 11 | 81.078 | 0.39 | | |
| 12 | 51.907 | 4.85 | 1.85478 | 24.8 |
| 13 | −48.997 | 2.20 | | |
| 14 | −23.647 | 1.00 | 1.59282 | 68.6 |
| 15 | −60.312 | (Variable) | | |
| 16 (Diaphragm) | ∞ | 0.50 | | |
| 17 | 35.307 | 6.08 | 1.65412 | 39.7 |
| 18 | −52.038 | 1.50 | 1.59522 | 67.7 |
| 19 | −238.158 | 1.98 | | |
| 20 | 44.197 | 4.56 | 1.48749 | 70.2 |
| 21 | −61.611 | 1.30 | 1.95375 | 32.3 |
| 22 | 81.466 | 2.78 | | |
| 23 | 1589.792 | 1.20 | 2.05090 | 26.9 |
| 24 | 31.846 | 4.93 | 1.48749 | 70.2 |
| 25 | −84.723 | 0.15 | | |
| 26 | 42.427 | 4.90 | 1.67270 | 32.1 |
| 27 | −57.733 | 2.57 | | |
| 28 | −37.849 | 2.57 | 1.85478 | 24.8 |
| 29 | −23.648 | 1.20 | 1.80400 | 46.6 |
| 30 | 395.421 | (Variable) | | |
| 31 | 35.831 | 8.43 | 1.49700 | 81.5 |
| 32 | −33.018 | 1.20 | 2.05090 | 26.9 |
| 33 | −92.495 | 0.15 | | |
| 34* | 95.764 | 7.09 | 1.58313 | 59.4 |
| 35* | −30.813 | (Variable) | | |
| 36 | 94.522 | 3.12 | 1.85478 | 24.8 |
| 37 | −145.150 | 1.00 | 1.80400 | 46.5 |
| 38 | 29.187 | (Variable) | | |
| 39* | −35.535 | 1.20 | 1.58313 | 59.4 |
| 40* | −390.712 | (Variable) | | |
| 41 | 182.834 | 2.61 | 1.72047 | 34.7 |
| 42 | −309.086 | (Variable) | | |
| Image Plane | ∞ | | | |

ASPHERIC DATA
8th Surface $K = 0.00000e+000$ $A\,4 = 5.11258e-006$ $A\,6 = 2.33796e-010$ $A\,8 = -1.55382e-011$
$A10 = 4.35749e-014$
34th Surface $K = 0.00000e+000$ $A\,4 = -1.35080e-005$ $A\,6 = -6.25836e-009$
35th Surface $K = 0.00000e+000$ $A\,4 = 4.06644e-006$ $A\,6 = -9.27789e-009$ $A\,8 = 3.24854e-012$
39th Surface $K = 0.00000e+000$ $A\,4 = -1.62256e-005$ $A\,6 = 6.95891e-008$
40th Surface $K = 0.00000e+000$ $A\,4 = -1.69549e-005$ $A\,6 = 8.34948e-008$ $A\,8 = -1.23021e-010$
$A10 = 1.79021e-013$

| VARIOUS DATA Zoom Ratio 15.68 | | | |
|---|---|---|---|
| | Wide-Angle | Middle | Telephoto |
| Focal Length: | 24.74 | 76.74 | 387.90 |
| Fno.: | 3.60 | 5.30 | 6.50 |
| Half Angle of View: | 39.51 | 15.75 | 3.19 |
| Image Height: | 20.40 | 21.64 | 21.64 |
| Overall Lens Length: | 194.51 | 241.18 | 287.86 |
| BF: | 13.32 | 48.47 | 46.46 |
| d 7 | 0.80 | 32.19 | 75.34 |
| d15 | 41.25 | 24.57 | 1.49 |
| d30 | 8.70 | 1.35 | 1.50 |
| d35 | 2.75 | 1.32 | 3.40 |

-continued

| Surface Data | | | |
|---|---|---|---|
| d38 | 26.36 | 26.53 | 26.10 |
| d40 | 1.39 | 6.82 | 33.63 |
| d42 | 13.32 | 48.47 | 46.46 |

| Zoom Lens Unit Data | | |
|---|---|---|
| Lens Unit | Starting Surface | Focal Length |
| 1 | 1 | 117.12 |
| 2 | 8 | −19.07 |
| 3 | 16 | 69.43 |
| 4 | 31 | 32.56 |
| 5 | 36 | −56.83 |
| 6 | 39 | −67.12 |
| 7 | 41 | 159.81 |

Numerical Example 2

| Surface Data | | | | |
|---|---|---|---|---|
| Surface Number | r | d | nd | vd |
| 1 | 199.405 | 1.60 | 1.90043 | 37.4 |
| 2 | 75.771 | 7.61 | 1.43875 | 94.7 |
| 3 | 2140.436 | 0.15 | | |
| 4 | 115.473 | 4.66 | 1.49700 | 81.5 |
| 5 | 1098.547 | 0.15 | | |
| 6 | 69.666 | 7.10 | 1.59522 | 67.7 |
| 7 | 846.408 | (Variable) | | |
| 8* | 551.105 | 1.00 | 1.88300 | 40.8 |
| 9 | 20.523 | 6.99 | | |
| 10 | −39.928 | 0.80 | 1.77250 | 49.6 |
| 11 | 72.405 | 0.40 | | |
| 12 | 46.081 | 4.80 | 1.85478 | 24.8 |
| 13 | −43.915 | 1.53 | | |
| 14 | −24.602 | 1.00 | 1.59282 | 68.6 |
| 15 | −125.843 | (Variable) | | |
| 16 (Diaphragm) | ∞ | 0.50 | | |
| 17 | 30.968 | 4.13 | 1.65412 | 39.7 |
| 18 | −217.058 | 1.50 | 1.59522 | 67.7 |
| 19 | −448.901 | 3.35 | | |
| 20 | 56.088 | 3.24 | 1.48749 | 70.2 |
| 21 | −67.751 | 1.30 | 1.95375 | 32.3 |
| 22 | 141.265 | 2.14 | | |
| 23 | 226.016 | 1.20 | 2.05090 | 26.9 |
| 24 | 32.840 | 3.60 | 1.48749 | 70.2 |
| 25 | −123.382 | 0.15 | | |
| 26 | 40.663 | 3.54 | 1.67270 | 32.1 |
| 27 | −78.743 | 2.82 | | |
| 28 | −32.963 | 1.50 | 1.72825 | 28.5 |
| 29 | −25.296 | 1.20 | 1.80400 | 46.6 |
| 30 | −351.179 | (Variable) | | |
| 31 | 29.318 | 7.97 | 1.49700 | 81.5 |
| 32 | −35.576 | 1.20 | 2.05090 | 26.9 |
| 33 | −80.849 | 0.15 | | |
| 34* | 97.098 | 5.81 | 1.58313 | 59.4 |
| 35* | −31.216 | (Variable) | | |
| 36 | 74.951 | 2.88 | 1.85478 | 24.8 |
| 37 | −213.306 | 1.00 | 1.80400 | 46.5 |
| 38 | 23.473 | (Variable) | | |
| 39* | −27.665 | 1.20 | 1.58313 | 59.4 |
| 40* | −341.237 | (Variable) | | |
| 41 | 104.931 | 3.23 | 1.72047 | 34.7 |
| 42 | −326.245 | (Variable) | | |
| Image Plane | ∞ | | | |

-continued

| Surface Data |
|---|

ASPHERIC DATA
8th Surface

K = 0.00000e+000 A 4 = 3.30413e−006 A 6 = −2.34829e−010 A 8 = −7.25877e−012
A10 = 3.62542e−014
34th Surface K = 0.00000e+000 A 4 = −2.52752e−005 A 6 = −1.72796e−008
35th Surface K = 0.00000e+000 A 4 = 1.03432e−006 A 6 = −1.72341e−008 A 8 = −2.03279e−012
39th Surface K = 0.00000e+000 A 4 = −8.73928e−006 A 6 = 3.74509e−008
40th Surface K = 0.00000e+000 A 4 = −1.11329e−005 A 6 = 5.14822e−008 A 8 = −1.29169e−010
A10 = 2.27948e−013

| VARIOUS DATA Zoom Ratio 11.73 | | | |
|---|---|---|---|
| | Wide-Angle | Middle | Telephoto |
| Focal Length: | 24.72 | 69.39 | 289.87 |
| Fno.: | 3.60 | 5.30 | 5.88 |
| Half Angle of View: | 39.53 | 17.32 | 4.27 |
| Image Height: | 20.40 | 21.64 | 21.64 |
| Overall Lens Length: | 168.78 | 202.25 | 235.73 |
| BF: | 13.34 | 39.12 | 36.81 |
| d 7 | 0.80 | 26.27 | 60.83 |
| d15 | 33.80 | 18.89 | 1.50 |
| d30 | 7.45 | 2.46 | 1.50 |
| d35 | 1.70 | 1.20 | 1.20 |
| d38 | 18.58 | 18.88 | 19.79 |
| d40 | 1.72 | 4.03 | 22.71 |
| d42 | 13.34 | 39.12 | 36.81 |

| Zoom Lens Unit Data | | |
|---|---|---|
| Lens Unit | Starting Surface | Focal Length |
| 1 | 1 | 100.42 |
| 2 | 8 | −17.92 |
| 3 | 16 | 57.20 |
| 4 | 31 | 28.10 |
| 5 | 36 | −45.90 |
| 6 | 39 | −51.70 |
| 7 | 41 | 110.55 |

Numerical Example 3

| Surface Data | | | | |
|---|---|---|---|---|
| Surface Number | r | d | nd | vd |
| 1 | 225.740 | 1.60 | 1.83400 | 37.2 |
| 2 | 108.865 | 6.89 | 1.43875 | 94.7 |
| 3 | −1600.000 | 0.15 | | |
| 4 | 134.358 | 5.00 | 1.43875 | 94.7 |
| 5 | 2064.513 | 0.15 | | |
| 6 | 80.623 | 6.63 | 1.43875 | 94.7 |
| 7 | 448.566 | (Variable) | | |
| 8* | 397.426 | 1.00 | 1.88300 | 40.8 |
| 9 | 20.687 | 7.82 | | |
| 10 | −37.394 | 0.80 | 1.72916 | 54.7 |
| 11 | 118.335 | 0.31 | | |
| 12 | 60.610 | 5.48 | 1.76182 | 26.5 |
| 13 | −33.730 | 1.26 | | |
| 14 | −23.918 | 1.00 | 1.53775 | 74.7 |
| 15 | −161.887 | (Variable) | | |
| 16 | 34.423 | 3.74 | 1.85478 | 24.8 |

-continued

| Surface Data | | | | |
|---|---|---|---|---|
| 17 | 160.877 | 2.50 | | |
| 18 (Diaphragm) | ∞ | 0.00 | | |
| 19 | 41.440 | 1.20 | 1.92286 | 20.9 |
| 20 | 21.729 | 5.67 | 1.48749 | 70.2 |
| 21 | 341.505 | 0.15 | | |
| 22 | 35.787 | 5.42 | 1.49700 | 81.5 |
| 23 | −54.438 | 1.00 | 2.00100 | 29.1 |
| 24 | −132.964 | (Variable) | | |
| 25 | −839.627 | 1.00 | 1.95375 | 32.3 |
| 26 | 58.544 | 1.77 | | |
| 27 | −88.361 | 1.00 | 1.76200 | 40.1 |
| 28 | 24.743 | 4.00 | 1.85478 | 24.8 |
| 29 | 371.204 | (Variable) | | |
| 30 | 26.029 | 7.41 | 1.48749 | 70.2 |
| 31 | −26.003 | 1.00 | 1.95375 | 32.3 |
| 32 | −211.831 | 2.00 | | |
| 33* | 36.433 | 7.20 | 1.58313 | 59.4 |
| 34* | −31.674 | (Variable) | | |
| 35 | 69.957 | 2.71 | 1.80810 | 22.8 |
| 36 | −273.805 | 1.00 | 1.80400 | 46.5 |
| 37 | 24.333 | (Variable) | | |
| 38* | −32.780 | 1.20 | 1.58313 | 59.4 |
| 39* | −278.467 | (Variable) | | |
| 40 | 348.028 | 2.86 | 1.72047 | 34.7 |
| 41 | −138.495 | (Variable) | | |
| Image Plane | ∞ | | | |

ASPHERIC DATA
8th Surface $K = 0.00000e+000$ $A\,4 = 3.75838e{-}006$ $A\,6 = 1.01163e{-}009$ $A\,8 = -2.25190e{-}011$
$A10 = 6.72743e{-}014$
33rd Surface $K = 0.00000e+000$ $A\,4 = -2.30192e{-}005$ $A\,6 = -1.02293e{-}008$
34th Surface $K = 0.00000e+000$ $A\,4 = 7.93294e{-}006$ $A\,6 = -2.74475e{-}008$ $A\,8 = 2.05118e{-}011$
38th Surface $K = 0.00000e+000$ $A\,4 = -3.40508e{-}005$ $A\,6 = 1.11351e{-}007$
39th Surface $K = 0.00000e+000$ $A\,4 = -3.59306e{-}005$ $A\,6 = 1.49211e{-}007$ $A\,8 = -2.96761e{-}010$
$A10 = 4.90321e{-}013$

| VARIOUS DATA Zoom Ratio 15.67 | | | |
|---|---|---|---|
| | Wide-Angle | Middle | Telephoto |
| Focal Length: | 24.76 | 83.42 | 387.85 |
| Fno.: | 3.60 | 5.10 | 6.50 |
| Half Angle of View: | 39.49 | 14.54 | 3.19 |
| Image Height: | 20.40 | 21.64 | 21.64 |
| Overall Lens Length: | 171.65 | 227.55 | 283.44 |
| BF: | 12.35 | 51.91 | 46.44 |
| d 7 | 0.80 | 35.74 | 79.26 |
| d15 | 36.55 | 17.95 | 0.79 |
| d24 | 1.00 | 2.89 | 5.44 |
| d29 | 5.94 | 4.04 | 1.50 |
| d34 | 1.19 | 1.58 | 1.73 |
| d37 | 21.84 | 13.95 | 21.35 |
| d39 | 1.05 | 8.54 | 36.00 |
| d41 | 12.35 | 51.91 | 46.44 |

| Zoom Lens Unit Data | | |
|---|---|---|
| Lens Unit | Starting Surface | Focal Length |
| 1 | 1 | 127.84 |
| 2 | 8 | −19.14 |
| 3 | 16 | 32.42 |
| 4 | 25 | −40.11 |
| 5 | 30 | 28.16 |

-continued

| Surface Data | | |
|---|---|---|
| 6 | 35 | −48.33 |
| 7 | 38 | −63.83 |
| 8 | 40 | 137.85 |

Numerical Example 4

| Surface Data | | | | |
|---|---|---|---|---|
| Surface Number | r | d | nd | vd |
| 1 | 220.056 | 1.60 | 1.88300 | 40.8 |
| 2 | 93.279 | 8.03 | 1.43875 | 94.7 |
| 3 | −1293.245 | 0.15 | | |
| 4 | 97.100 | 5.97 | 1.49700 | 81.5 |
| 5 | 459.954 | 0.15 | | |
| 6 | 117.399 | 5.37 | 1.49700 | 81.5 |
| 7 | 1179.051 | (Variable) | | |
| 8* | 287.064 | 1.00 | 1.88300 | 40.8 |
| 9 | 25.736 | 7.94 | | |
| 10 | −53.742 | 0.80 | 1.72916 | 54.7 |
| 11 | 82.289 | 0.15 | | |
| 12 | 47.361 | 5.44 | 1.85478 | 24.8 |
| 13 | −68.849 | 3.86 | | |
| 14 | −25.876 | 1.00 | 1.59282 | 68.6 |
| 15 | −165.250 | (Variable) | | |
| 16 (Diaphragm) | ∞ | 0.50 | | |
| 17 | 31.300 | 5.94 | 1.65412 | 39.7 |
| 18 | −78.341 | 1.50 | 1.53775 | 74.7 |
| 19 | 184.715 | 0.64 | | |
| 20 | 40.252 | 4.37 | 1.48749 | 70.2 |
| 21 | −87.206 | 1.30 | 1.95375 | 32.3 |
| 22 | 81.666 | 2.63 | | |
| 23 | 349.412 | 1.20 | 2.05090 | 26.9 |
| 24 | 27.148 | 5.60 | 1.48749 | 70.2 |
| 25 | −69.169 | 0.15 | | |
| 26 | 35.657 | 5.32 | 1.67270 | 32.1 |
| 27 | −53.436 | 2.40 | | |
| 28 | −37.138 | 2.92 | 1.85478 | 24.8 |
| 29 | −21.053 | 1.20 | 1.80400 | 46.6 |
| 30 | 91.373 | (Variable) | | |
| 31 | 27.579 | 8.08 | 1.49700 | 81.5 |
| 32 | −31.348 | 1.20 | 2.05090 | 26.9 |
| 33 | −116.343 | 0.15 | | |
| 34* | 70.266 | 6.46 | 1.58313 | 59.4 |
| 35* | −29.189 | (Variable) | | |
| 36 | 70.017 | 2.72 | 1.85478 | 24.8 |
| 37 | −298.217 | 1.00 | 1.80400 | 46.5 |
| 38 | 22.447 | (Variable) | | |
| 39* | −28.961 | 1.20 | 1.49700 | 81.5 |
| 40* | 170.942 | (Variable) | | |
| 41 | 85.814 | 3.17 | 1.72047 | 29.0 |
| 42 | −2568.107 | (Variable) | | |
| Image Plane | ∞ | | | |

ASPHERIC DATA
8th Surface

K = 0.00000e+000 A 4 = 1.78579e−006 A 6 = 1.38483e−009 A 8 = −3.45739e−012
A10 = 1.70654e−014
34th Surface K = 0.00000e+000 A 4 = −2.29409e−005 A 6 = −1.68589e−008
35th Surface K = 0.00000e+000 A 4 = 2.22442e−006 A 6 = −1.75687e−008 A 8 = −2.35901e−012
39th Surface K = 0.00000e+000 A 4 = −1.54091e−006 A 6 = 2.39947e−008

-continued

| Surface Data |
| --- |

40th Surface

K = 0.00000e+000 A 4 = −6.09353e−006 A 6 = 3.17194e−008 A 8 = −1.07433e−010
A10 = 2.14422e−013

| VARIOUS DATA Zoom Ratio 16.83 | | | |
| --- | --- | --- | --- |
|  | Wide-Angle | Middle | Telephoto |
| Focal Length: | 28.81 | 94.89 | 484.70 |
| Fno.: | 3.60 | 5.30 | 7.20 |
| Half Angle of View: | 35.30 | 12.84 | 2.56 |
| Image Height: | 20.40 | 21.64 | 21.64 |
| Overall Lens Length: | 194.00 | 240.17 | 286.34 |
| BF: | 13.85 | 43.81 | 39.37 |
| d 7 | 0.80 | 42.00 | 89.13 |
| d15 | 46.22 | 22.88 | 1.50 |
| d30 | 3.17 | 1.31 | 1.50 |
| d35 | 1.19 | 4.12 | 1.20 |
| d38 | 25.44 | 19.33 | 26.49 |
| d40 | 2.23 | 5.61 | 26.05 |
| d42 | 13.85 | 43.81 | 39.37 |

| Zoom Lens Unit Data | | |
| --- | --- | --- |
| Lens Unit | Starting Surface | Focal Length |
| 1 | 1 | 134.78 |
| 2 | 8 | −21.22 |
| 3 | 16 | 70.23 |
| 4 | 31 | 29.22 |
| 5 | 36 | −44.34 |
| 6 | 39 | −49.73 |
| 7 | 41 | 115.31 |

Numerical Example 5

| Surface Data | | | | |
| --- | --- | --- | --- | --- |
| Surface Number | r | d | nd | vd |
| 1 | 223.853 | 1.60 | 1.88300 | 40.8 |
| 2 | 113.461 | 8.76 | 1.43875 | 94.7 |
| 3 | −7333.776 | 0.15 |  |  |
| 4 | 115.066 | 7.20 | 1.43875 | 94.7 |
| 5 | 647.350 | 0.15 |  |  |
| 6 | 159.127 | 4.98 | 1.49700 | 81.5 |
| 7 | 765.639 | (Variable) |  |  |
| 8 | 91.064 | 1.80 | 1.80311 | 46.7 |
| 9 | 26.688 | 9.72 |  |  |
| 10 | −83.582 | 1.40 | 1.72788 | 54.9 |
| 11 | 76.171 | 0.15 |  |  |
| 12 | 45.585 | 5.11 | 1.84666 | 23.8 |
| 13 | −571.011 | 8.84 |  |  |
| 14 | −36.426 | 1.40 | 1.59282 | 68.6 |
| 15 | −209.675 | (Variable) |  |  |
| 16 (Diaphragm) | ∞ | 0.50 |  |  |
| 17 | 33.903 | 5.16 | 1.65412 | 39.7 |
| 18 | −96.183 | 1.50 | 1.53775 | 74.7 |
| 19 | 108.454 | 3.24 |  |  |
| 20 | 41.851 | 3.65 | 1.48749 | 70.2 |
| 21 | −137.968 | 1.30 | 1.95375 | 32.3 |
| 22 | 80.578 | 2.63 |  |  |
| 23 | 282.536 | 1.20 | 2.05090 | 26.9 |
| 24 | 27.481 | 5.52 | 1.48749 | 70.2 |
| 25 | −59.637 | 0.15 |  |  |
| 26 | 34.183 | 5.19 | 1.67270 | 32.1 |
| 27 | −55.307 | 2.44 |  |  |
| 28 | −36.723 | 5.58 | 1.85478 | 24.8 |
| 29 | −23.880 | 1.20 | 1.80400 | 46.6 |
| 30 | 140.439 | 1.82 |  |  |

-continued

| Surface Data | | | | |
|---|---|---|---|---|
| 31 | 32.792 | 6.67 | 1.49700 | 81.5 |
| 32 | −36.536 | 1.20 | 2.05090 | 26.9 |
| 33 | −107.126 | 0.15 | | |
| 34* | 1059.034 | 5.43 | 1.58313 | 59.4 |
| 35* | −27.868 | (Variable) | | |
| 36 | 65.301 | 2.63 | 1.85478 | 24.8 |
| 37 | −432.146 | 1.00 | 1.80400 | 46.5 |
| 38 | 21.709 | (Variable) | | |
| 39* | −28.832 | 1.20 | 1.49700 | 81.5 |
| 40* | 245.015 | (Variable) | | |
| 41 | 74.912 | 3.12 | 1.72047 | 40.0 |
| 42 | 586.438 | (Variable) | | |
| Image Plane | ∞ | | | |

ASPHERIC DATA
34th Surface $K = 0.00000e+000$ $A\,4 = -2.02740e-005$ $A\,6 = -8.62308e-009$
35th Surface $K = 0.00000e+000$ $A\,4 = -1.55557e-006$ $A\,6 = -4.58763e-009$ $A\,8 = -7.70161e-012$
39th Surface $K = 0.00000e+000$ $A\,4 = 8.69486e-006$ $A\,6 = -6.30755e-009$
40th Surface $K = 0.00000e+000$ $A\,4 = 3.44567e-006$ $A\,6 = -1.80194e-008$ $A\,8 = 2.95620e-011$
$A10 = -7.04293e-014$ VARIOUS DATA
Zoom Ratio 17.61

| | Wide-Angle | Middle | Telephoto |
|---|---|---|---|
| Focal Length: | 33.05 | 140.67 | 581.87 |
| Fno.: | 4.10 | 5.90 | 7.20 |
| Half Angle of View: | 31.69 | 8.74 | 2.13 |
| Image Height: | 20.40 | 21.64 | 21.64 |
| Overall Lens Length: | 218.72 | 276.34 | 333.97 |
| BF: | 14.32 | 39.28 | 46.78 |
| d 7 | 0.80 | 69.66 | 117.45 |
| d15 | 56.37 | 17.64 | 1.52 |
| d35 | 1.20 | 7.70 | 1.36 |
| d38 | 30.79 | 19.31 | 24.32 |
| d40 | 1.50 | 9.01 | 28.80 |
| d42 | 14.32 | 39.28 | 46.78 |

Zoom Lens Unit Data

| Lens Unit | Starting Surface | Focal Length |
|---|---|---|
| 1 | 1 | 176.42 |
| 2 | 8 | −26.51 |
| 3 | 16 | 37.19 |
| 4 | 36 | −43.72 |
| 5 | 39 | −51.83 |
| 6 | 41 | 118.90 |

TABLE 1

| | f1/ft | mr/bfw | m3/bfw | fr/f1 | f1/f2 | m1/f1 | β2t/β2w | dpw/fw | Lt/ft | VdLR |
|---|---|---|---|---|---|---|---|---|---|---|
| Ex. 1 | 0.302 | −2.488 | −4.396 | 1.364 | −6.143 | −0.797 | 5.707 | 4.589 | 0.742 | 34.7 |
| Ex. 2 | 0.346 | −1.760 | −2.941 | 1.101 | −5.604 | −0.667 | 5.162 | 3.899 | 0.813 | 34.7 |
| Ex. 3 | 0.330 | −2.759 | −5.593 | 1.078 | −6.681 | −0.874 | 4.872 | 3.634 | 0.731 | 34.7 |
| Ex. 4 | 0.278 | −1.844 | −3.519 | 0.856 | −6.353 | −0.685 | 7.332 | 3.663 | 0.591 | 29.0 |
| Ex. 5 | 0.303 | −2.266 | −3.732 | 0.674 | −6.656 | −0.653 | 8.095 | 3.338 | 0.574 | 40.0 |

Figure 11:
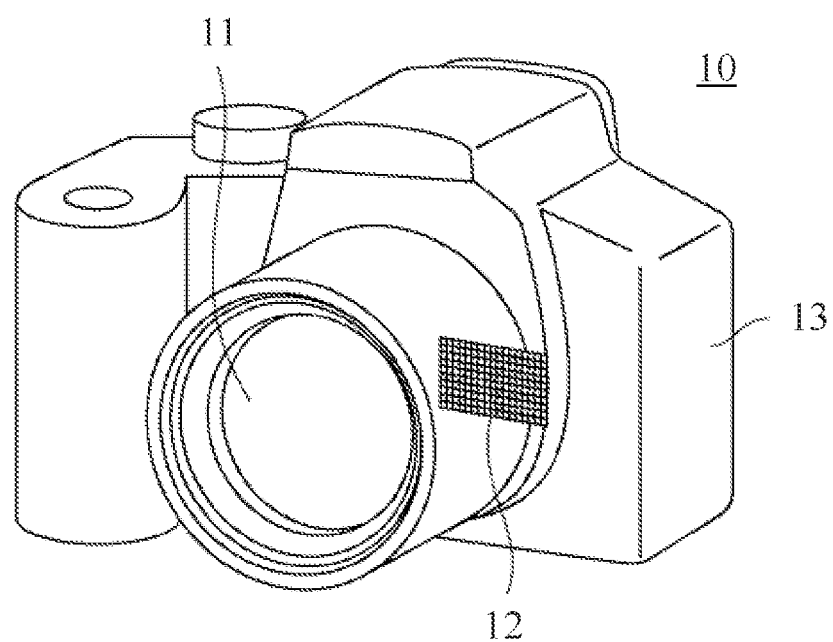
FIG. 11 is a schematic view of an image pickup apparatus having a zoom lens according to each example.

Referring now to FIG. 11, a description will be given of an example of a digital still camera (image pickup apparatus 10) using the zoom lens L0 according to each example for an imaging optical system. FIG. 11 is a schematic view of the image pickup apparatus 10 provided with the zoom lens L0 according to each example.

In FIG. 11, reference numeral 13 denotes a camera body, and reference numeral 11 denotes an imaging optical system including the zoom lens L0 according to any one of Examples 1 to 5. Reference numeral 12 denotes an image sensor (photoelectric conversion element) such as a CCD sensor or a CMOS sensor, which is built in the camera body 13, receives an optical image formed by the imaging optical system 11, and photoelectrically converts it. The camera body 13 may be a so-called single-lens reflex camera having a quick turn mirror, or a so-called mirrorless camera having no quick turn mirror.

The zoom lens according to the present invention applied to the image pickup apparatus 10 such as a digital still camera in this way can provide the image pickup apparatus with a high optical performance. The zoom lens according to each example can be similarly applied to a video camera.

Each example can provide a compact zoom lens having a high magnification and a high optical characteristic, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-099674, filed on Jun. 8, 2020, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a rear group having a plurality of lens units,
   wherein the rear group includes a lens unit LR closest to an image plane,
   wherein each distance between adjacent lens units changes during zooming,
   wherein a lens disposed closest to the image side in the zoom lens is a biconvex lens, and
   wherein the following inequalities are satisfied:

$$-4.0 < mr/bfw < -1.5$$

$$-7.0 < m3/bfw < -2.5$$

where mr is a difference between a position of the lens unit LR relative to the image plane at the telephoto end and a position of the lens unit LR relative to the image plane at a wide-angle end, a sign of mr being negative when the lens unit LR is positioned closer to the object side at the telephoto end than at the wide-angle end, bfw is a distance on an optical axis from a surface closest to the image plane of the lens unit LR to the image plane at the wide-angle end, m3 is a difference between a position of the third lens unit relative to the image plane at the telephoto end and a position of the third lens unit relative to the image plane at the wide-angle end, a sign of m3 being negative when the third lens unit is positioned closer to the object side at the telephoto end than at the wide-angle end.

2. The zoom lens according to claim 1, wherein the rear group includes at least three lens units.

3. The zoom lens according to claim 1, wherein the first lens unit includes one negative lens and three positive lenses.

4. The zoom lens according to claim 1, wherein during zooming from the wide-angle end to the telephoto end, the lens unit LR moves to the object side and then to the image side.

5. The zoom lens according to claim 1, wherein the following inequality is satisfied:

$$0.3 < fr/f1 < 2.8$$

where fr is a focal length of the lens unit LR, and f1 is a focal length of the first lens unit.

6. The zoom lens according to claim 1, wherein the following inequality is satisfied:

$$-9.0 < f1/f2 < -3.5$$

where f2 is a focal length of the second lens unit, and f1 is a focal length of the first lens unit.

7. The zoom lens according to claim 1, wherein the following inequality is satisfied:

$$-1.2 < m1/f1 < -0.4$$

where m1 is a moving amount of the first lens unit during zooming from the wide-angle end to the telephoto end, and f1 is a focal length of the first lens unit.

8. The zoom lens according to claim 1, wherein the following inequality is satisfied:

$$3.0 < \beta 2t/\beta 2w < 12.0$$

where $\beta 2t$ is a lateral magnification of the second lens unit at the telephoto end, and $\beta 2w$ is a lateral magnification of the second lens unit at the wide-angle end.

9. The zoom lens according to claim 1, further comprising a diaphragm,
wherein the following inequality is satisfied:

$$2.0 < dpw/fw < 7.0$$

where dpw is a distance on the optical axis from the diaphragm to the image plane at the wide-angle end, and fw is a focal length of the zoom lens at the wide-angle end.

10. The zoom lens according to claim 1, wherein the following inequality is satisfied:

$$0.4 < Lt/ft < 1.2$$

where Lt is a distance on the optical axis from a surface of the zoom lens closest to an object to the image plane at the telephoto end, and ft is a focal length of the zoom lens at a telephoto end.

11. The zoom lens according to claim 1, wherein the following inequality is satisfied:

$$2.0 < VdLR < 50.0$$

where VdLR is an Abbe number of the biconvex lens.

12. The zoom lens according to claim 1, wherein the following inequality is satisfied:

$$0.20 < f1/ft < 0.40$$

where f1 is a focal length of the first lens unit, and ft is a focal length of the zoom lens at a telephoto end.

13. An image pickup apparatus comprising:
   the zoom lens according to claim 1; and
   an image sensor configured to receive an image formed by the zoom lens.

* * * * *